(12) United States Patent
Hishida et al.

(10) Patent No.: US 7,409,300 B2
(45) Date of Patent: Aug. 5, 2008

(54) ULTRASONIC FLOW-VELOCITY DISTRIBUTION METER/FLOWMETER, METHOD OF ULTRASONICALLY MEASURING FLOW VELOCITY DISTRIBUTION/FLOWRATE, PROGRAM FOR ULTRASONICALLY MEASURING FLOW VELOCITY DISTRIBUTION/FLOWRATE

(75) Inventors: Koichi Hishida, Yokohama (JP); Michitsugu Mori, Tokyo (JP); Hideaki Tezuka, Tokyo (JP)

(73) Assignees: Keio University, Tokyo (JP); The Tokyo Electric Power Company, Incorporated, Tokyo (JP)

( * ) Notice: Subject to any disclaimer, the term of this patent is extended or adjusted under 35 U.S.C. 154(b) by 0 days.

(21) Appl. No.: 10/555,640

(22) PCT Filed: Apr. 28, 2004

(86) PCT No.: PCT/JP2004/006175

§ 371 (c)(1),
(2), (4) Date: Nov. 30, 2006

(87) PCT Pub. No.: WO2004/099732

PCT Pub. Date: Nov. 18, 2004

(65) Prior Publication Data

US 2007/0156355 A1    Jul. 5, 2007

(30) Foreign Application Priority Data

Jun. 5, 2003    (JP)    ............ P2003-128506

(51) Int. Cl.
*G01F 1/00*    (2006.01)
*G06F 19/00*    (2006.01)

(52) U.S. Cl. ........................................ 702/45

(58) Field of Classification Search .......... 702/45
See application file for complete search history.

(56) References Cited

U.S. PATENT DOCUMENTS 5,650,571 A  *  7/1997  Freud et al. .............. 73/861.06

(Continued)

FOREIGN PATENT DOCUMENTS

EP    0 794 411 A2    9/1997

(Continued)

OTHER PUBLICATIONS

Medcyclopaedia, "Wall filter", Oct. 2007, p. 1.*

*Primary Examiner*—John E Barlow, Jr.
*Assistant Examiner*—Cindy H Khuu
(74) *Attorney, Agent, or Firm*—Oblon, Spivak, McClelland, Maier & Neustadt, P.C.

(57) ABSTRACT

An ultrasonic flowmeter includes: an emission trigger oscillator outputting a trigger signal; an ultrasonic oscillator generating and outputting ultrasonic pulses by the trigger signal from the emission trigger oscillator; an ultrasonic pulse receiver transmitting the ultrasonic pulses output from the ultrasonic oscillator toward a measurement line within a fluid, and receiving an ultrasonic echo signal serving as reflected waves reflected off an ultrasonic reflector suspended within the fluid; a signal processor subjecting the ultrasonic echo signal received by the ultrasonic pulse receiver to signal processing; and a signal analyzer analyzing the ultrasonic echo signal subjected to the signal processing by the signal processor, calculating the position and speed of the ultrasonic reflector positioned along the measurement line, and measuring at least one of the flow-speed distribution and flow of the fluid from the calculated results.

12 Claims, 14 Drawing Sheets

U.S. PATENT DOCUMENTS

| | | | |
|---|---|---|---|
| 6,067,861 A | 5/2000 | Shekarriz et al. | |
| 6,535,835 B1 * | 3/2003 | Rubin et al. | 702/159 |
| RE38,209 E * | 8/2003 | Yamazaki et al. | 600/455 |
| 2005/0241411 A1 * | 11/2005 | Hishida et al. | 73/861.25 |
| 2005/0245827 A1 * | 11/2005 | Takeda et al. | 600/450 |

FOREIGN PATENT DOCUMENTS

| | | |
|---|---|---|
| JP | 63-1111 | 1/1988 |
| JP | 9-229734 | 9/1997 |
| JP | 2000-97742 | 4/2000 |

* cited by examiner

FIG. 3A
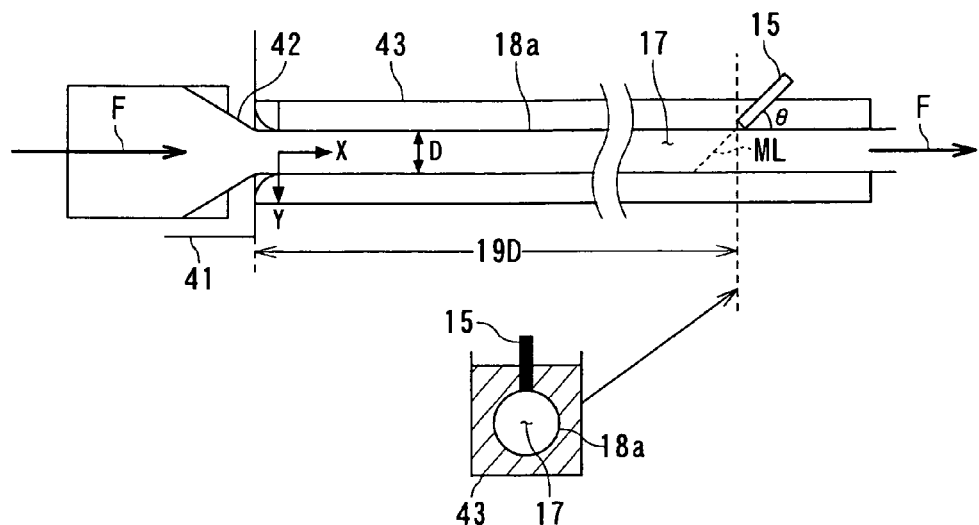
FIG. 3B
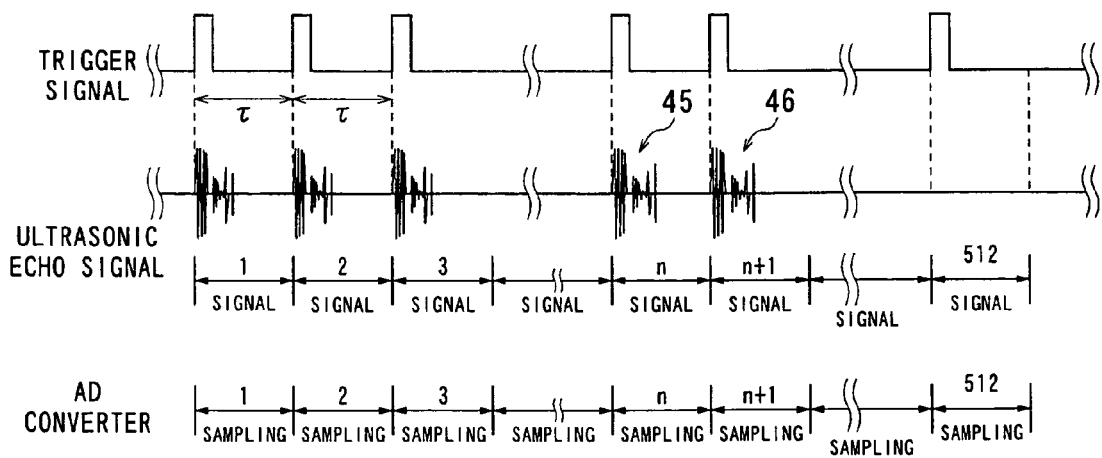
FIG. 4

ULTRASONIC FLOW-VELOCITY DISTRIBUTION METER/FLOWMETER, METHOD OF ULTRASONICALLY MEASURING FLOW VELOCITY DISTRIBUTION/FLOWRATE, PROGRAM FOR ULTRASONICALLY MEASURING FLOW VELOCITY DISTRIBUTION/FLOWRATE

PARTIES TO A JOINT RESEARCH AGREEMENT

Tokyo Electric Power Company, Incorporated, a Japanese corporation and Keio University, a Japanese university, are parties to a Joint Research Agreement.

TECHNICAL FIELD

The present invention relates to an ultrasonic flowmeter for measuring the flow-speed distribution of a fluid and the flow thereof using ultrasonic pulses, a flow measurement method with the ultrasonic flowmeter, and a flow measurement program thereof, particularly to an ultrasonic flowmeter having a function for measuring the flow-speed distribution of various fluids flowing within a metal tube and flow thereof in a non-contact manner, a flow measurement method with the ultrasonic flowmeter, and a flow measurement program thereof.

BACKGROUND ART

As a conventional technique, an ultrasonic flowmeter using the ultrasonic pulsed method has been known as disclosed in Japanese Unexamined Patent Application Publication No. 2000-97742.

The ultrasonic flowmeter has a configuration wherein ultrasonic pulses are cast from a transducer onto a measurement line within a flow tube, ultrasonic echo signals, i.e., the reflected-wave signals from suspended fine particles in a fluid flowing in the fluid tube are analyzed so as to calculate the flow-speed distribution and the flow of the fluid flowing along the measurement line based upon the positions and velocities of the suspended fine particles. The measurement line is formed by an ultrasonic-pulse beam cast from the transducer.

The ultrasonic flowmeter may be applied to an opaque fluid and an opaque-fluid tube, as well as having the advantage of measuring the flow of a fluid flowing a fluid tube in a non-contact manner. Furthermore, the ultrasonic flowmeter has the advantage of measurement of the flow-speed distribution of an opaque fluid and the flow thereof, e.g., measurement of the flow of liquid metal such as mercury, sodium, and so forth, as well as having functions for measuring the flow-speed distribution and the flow of a fluid flowing in the flow tube with measurement along the measurement line.

The ultrasonic flowmeter has the advantage of detecting change in the flow-speed distribution over time along the measurement line formed by the ultrasonic pulses cast onto the fluid from the transducer, and accordingly, it is hoped that the ultrasonic flowmeter can be applied to measurement of a transient flow of a fluid flowing through the flow tube, and measurement of the flow-speed distribution and measurement of the flow in a turbulent situation.

An arrangement example of the ultrasonic flow-speed distributor and the ultrasonic flowmeter described above is disclosed in Japanese Unexamined Patent Application Publication No. 2000-97742 (see Patent document 1, for example).

[Patent document 1] Japanese Unexamined Patent Application Publication No. 2000-97742.

With a conventional ultrasonic flowmeter utilizing ultrasonic pulses, in the event that a fluid tube for guiding a fluid to be measured in which a great number of ultrasonic reflectors such as fine particles and bubbles are suspended is a metal tube, noise called clutter noise which is present constantly (regardless of time) is superimposed on an ultrasonic echo signal, which prevents the flow-speed distribution and flow of a fluid from accurate and high-precision measurement.

The present invention has been made in light of the above situation, and it is an object of the present invention to provide an ultrasonic flow-speed distributor and flowmeter, an ultrasonic flow-speed distribution and flow measurement method, and an ultrasonic flow-speed distribution and flow measurement program, which are capable of sufficiently reducing the noise level as to ultrasonic echo signals, and measuring flow-speed distribution and flow precisely, even in the event that noise, which is constantly present, such as clutter noise is superimposed on ultrasonic echo signals.

DISCLOSURE OF INVENTION

In order to solve the aforementioned problems, the present invention provides an ultrasonic flow-speed distributor and flowmeter comprising: emission trigger oscillating means for outputting a trigger signal; ultrasonic oscillating means for generating and outputting ultrasonic pulses by the trigger signal from the emission trigger oscillating means; ultrasonic pulse receiving means for transmitting the ultrasonic pulses output from the ultrasonic oscillating means toward a measurement line within a fluid, and receiving an ultrasonic echo signal serving as reflected waves reflected off an ultrasonic reflector suspended within the fluid; signal processing means for subjecting the ultrasonic echo signal received by the ultrasonic pulse receiving means to signal processing; and signal analyzing means for analyzing the ultrasonic echo signal subjected to the signal processing by the signal processing means, calculating the position and speed of the ultrasonic reflector positioned along the measurement line, and measuring at least one of the flow-speed distribution and flow of the fluid from the calculated results, wherein the signal processing means include a band-pass filtering processing unit for performing filtering processing for extracting the same frequency band as the ultrasonic pulses, of the received ultrasonic echo signals, an AD converter for subjecting the ultrasonic echo signal received from the band-pass filtering processing unit to analog-to-digital conversion, and a wall filter processing unit for subjecting the received ultrasonic echo signal to filtering processing using a wall filter.

Further, in order to solve the aforementioned problems, it is preferable that the wall filter processing unit is configured so as to perform filtering processing wherein low-frequency equivalent components are discarded from the corresponding point-in-time echo level signals regarding all of the corresponding points-in-time which are obtained regarding a plurality of corresponding points-in-time from the ultrasonic echo signals for the amount of n+1 (n is a positive integer) sequences.

Furthermore, in order to solve the aforementioned problems, it is preferable that the wall filter processing unit is configured so as to perform filtering processing wherein low-frequency equivalent components are discarded from the corresponding point-in-time echo level signals assuming that the S/N ratio of a signal obtained by subjecting the corresponding point-in-time echo level signals to Fourier transform is taken as a threshold.

In order to solve the aforementioned problems, the present invention provides an ultrasonic flow-speed distribution and flow measurement method comprising: an emission trigger oscillating procedure for outputting a trigger signal; an ultrasonic oscillating procedure for generating and outputting ultrasonic pulses by the trigger signal output from the emission trigger oscillating procedure; an ultrasonic pulse receiving procedure for transmitting the ultrasonic pulses output from the ultrasonic oscillating procedure toward a measurement line within a fluid, and receiving an ultrasonic echo signal serving as reflected waves reflected off an ultrasonic reflector suspended within the fluid; a signal processing procedure for subjecting the ultrasonic echo signal received by the ultrasonic pulse receiving means to signal processing; and a signal analyzing procedure for analyzing the ultrasonic echo signal subjected to the signal processing by the signal processing procedure, calculating the position and speed of the ultrasonic reflector positioned along the measurement line, and measuring at least one of the flow-speed distribution and flow of the fluid from the calculated results, wherein the signal processing procedure includes a band-pass filtering processing process for performing filtering processing for extracting the same frequency band as the ultrasonic pulses, of the received ultrasonic echo signals, an AD conversion process for subjecting the ultrasonic echo signal received from the band-pass filtering processing process to analog-to-digital conversion, and a wall filter processing process for subjecting the received ultrasonic echo signal to filtering processing using a wall filter.

Further, in order to solve the aforementioned problems, it is preferable that the ultrasonic oscillating procedure comprises: an electric pulse signal generating process for receiving the trigger signal to generate an electric pulse signal; and an ultrasonic pulse generating process for converting the electric pulse signal generated in the electric pulse signal generating process into ultrasonic pulses, and transmitting these.

Furthermore, in order to solve the aforementioned problems, it is preferable that the signal analyzing procedure comprises: a reflector position-and-speed calculating process for calculating the position and speed of an ultrasonic reflector group within a fluid; a flow-speed distribution calculating process for calculating the flow-speed distribution of the fluid from the position and speed of the ultrasonic reflector group within the fluid calculated in the reflector position-and-speed calculating process; and a flow calculating process for integrating the flow-speed distribution calculated in the flow-speed calculating process along the internal area of a fluid tube to calculate flow.

In addition, in order to solve the aforementioned problems, it is preferable that the wall filter processing process comprises: a corresponding point-in-time echo level acquisition step for acquiring, from digitized ultrasound echo signals, a corresponding point-in-time echo level signal representing the relation between the number of sequences and a signal level at the corresponding point-in-time of each sequence; an FFT processing step for subjecting the corresponding point-in-time echo level signal obtained in the corresponding point-in-time echo level signal acquisition step to Fourier transform; a clutter noise reduction processing step for subjecting the frequency equivalent components of the corresponding point-in-time echo level signal obtained in the FFT processing step to filtering processing; and an inverse FFT processing step for sorting in time-sequence order the frequency equivalent components of the corresponding point-in-time echo level signal as inverse Fourier transform again to restructure a digital ultrasonic echo signal.

Further, in order to solve the aforementioned problems, it is preferable that the clutter noise reduction processing step subjects the frequency equivalent components of the corresponding point-in-time echo level signal obtained in the FFT processing step to filtering processing wherein an S/N ratio is taken as a threshold.

Furthermore, in order to solve the aforementioned problems, it is preferable that the reflector position-and-speed calculating process comprises: a cross-correlation computing processing step for computing the cross-correlation of reference waves and search waves; a phase identifying step for regarding reflected waves as the reflected waves from the same ultrasonic reflector, in the event that the correlation value of the reference waves and search waves is equal to or greater than a steady value (threshold); a phase difference computing step for computing the phase difference of the reference waves and the search waves identified in the phase identifying step; and a position-and-speed calculating step for calculating the position and speed of the ultrasonic reflector from the phase difference obtained in the phase difference computing step, wherein the cross-correlation computing processing step subjects the corresponding point-in-time echo level signal for each corresponding point-in-time to Fourier transform, calculates an average frequency $f_G$ and an RMS value $\sigma$, calculates the speed range of the ultrasonic reflector corresponding to a range of $f_G \pm 3\sigma$ using the calculated average frequency $f_G$ and RMS value $\sigma$, and sets the size of the search window using the calculated speed range of the ultrasonic reflector.

In order to solve the aforementioned problems, the present invention provides an ultrasonic flow-speed distribution and flow measurement processing program for causing a computer to execute: an emission trigger oscillating procedure for outputting a trigger signal; an ultrasonic oscillating procedure for generating and outputting ultrasonic pulses by the trigger signal output from the emission trigger oscillating procedure; an ultrasonic pulse receiving procedure for transmitting the ultrasonic pulses output from the ultrasonic oscillating procedure toward a measurement line within a fluid, and receiving an ultrasonic echo signal serving as reflected waves reflected off an ultrasonic reflector suspended within the fluid; a signal processing procedure for subjecting the ultrasonic echo signal received by the ultrasonic pulse receiving means to signal processing; and a signal analyzing procedure for analyzing the ultrasonic echo signal subjected to the signal processing by the signal processing procedure, calculating the position and speed of the ultrasonic reflector positioned along the measurement line, and measuring at least one of the flow-speed distribution and flow of the fluid from the calculated results; wherein the signal processing procedure includes a band-pass filtering processing process for performing filtering processing for extracting the same frequency band as the ultrasonic pulses, of the received ultrasonic echo signals, an AD conversion process for subjecting the ultrasonic echo signal received from the band-pass filtering processing process to analog-to-digital conversion, and a wall filter processing process for subjecting the received ultrasonic echo signal to filtering processing using a wall filter.

Further, in order to solve the aforementioned problems, it is preferable that the wall filter processing process comprising: a corresponding point-in-time echo level acquisition step for acquiring a corresponding point-in-time echo level signal representing the relation between the number of sequences and a signal level at the correspond point-in-time of each sequence; an FFT processing step for subjecting the corresponding point-in-time echo level signal obtained in the corresponding point-in-time echo level signal acquisition step to Fourier transform; a clutter noise reduction processing step for subjecting the frequency equivalent components of the corresponding point-in-time echo level signal obtained in the FFT processing step to filtering processing; and an inverse FFT processing step for sorting the frequency equivalent components of the corresponding point-in-time echo level signal as inverse Fourier transform again to restructure a digital ultrasonic echo signal; wherein the program causes the computer to execute the corresponding point-in-time echo level acquisition step, FFT processing step, clutter noise reduction processing step, and inverse FFT processing step in the wall filter processing process.

Further, in order to solve the aforementioned problems, it is preferable that the signal analyzing procedure comprising: a reflector position-and-speed calculating process for calculating the position and speed of an ultrasonic reflector group within a fluid; a flow-speed distribution calculating process for calculating the flow-speed distribution of the fluid from the position and speed of the ultrasonic reflector group within the fluid calculated in the reflector position-and-speed calculating process; and a flow calculating process for integrating the flow-speed distribution calculated in the flow-speed calculating process along the internal area of a fluid tube to calculate flow; wherein the program causes the computer to execute the reflector position-and-speed calculating process, flow-speed distribution calculating process, and flow calculating process in the signal analyzing procedure.

In addition, in order to solve the aforementioned problems, it is preferable that the program causes the computer to execute filtering processing wherein an S/N ratio is taken as a threshold as to the frequency equivalent components of the corresponding point-in-time echo level signal obtained in the FFT processing step.

BRIEF DESCRIPTION OF THE DRAWINGS

FIGS. 3A and 3B are explanatory diagrams representing in more detail the supply source of the fluid to be measured, and the perimeter of the metal tube in the schematic configuration diagram of the ultrasonic flow-speed distributor and flowmeter shown in FIG. 1, more specifically, FIG. 3A is a longitudinal sectional drawing of metal tube and FIG. 3B is a cross-sectional drawing of measurement test area.

FIG. 4 is an explanatory diagram for describing the relation between the trigger signal, the ultrasonic echo signal received waveform, and the sampling timing of the AD converter.

FIG. 12A is an explanatory diagrams describing the digital ultrasonic echo signals corresponding to from 1st sequence (sequence #1) to n'th sequence (sequence #n) and FIG. 12B is an explanatory diagrams describing the corresponding point-in-time echo level signal.

BEST MODE FOR CARRYING OUT THE INVENTION

Description will be made regarding an ultrasonic flow-speed distributor and flowmeter, an ultrasonic flow-speed distribution and flow measurement method, and an ultrasonic flow-speed distribution and flow measurement program according to an embodiment of the present invention with reference to the accompanying drawings.

[Measurement System]

Figure 1:
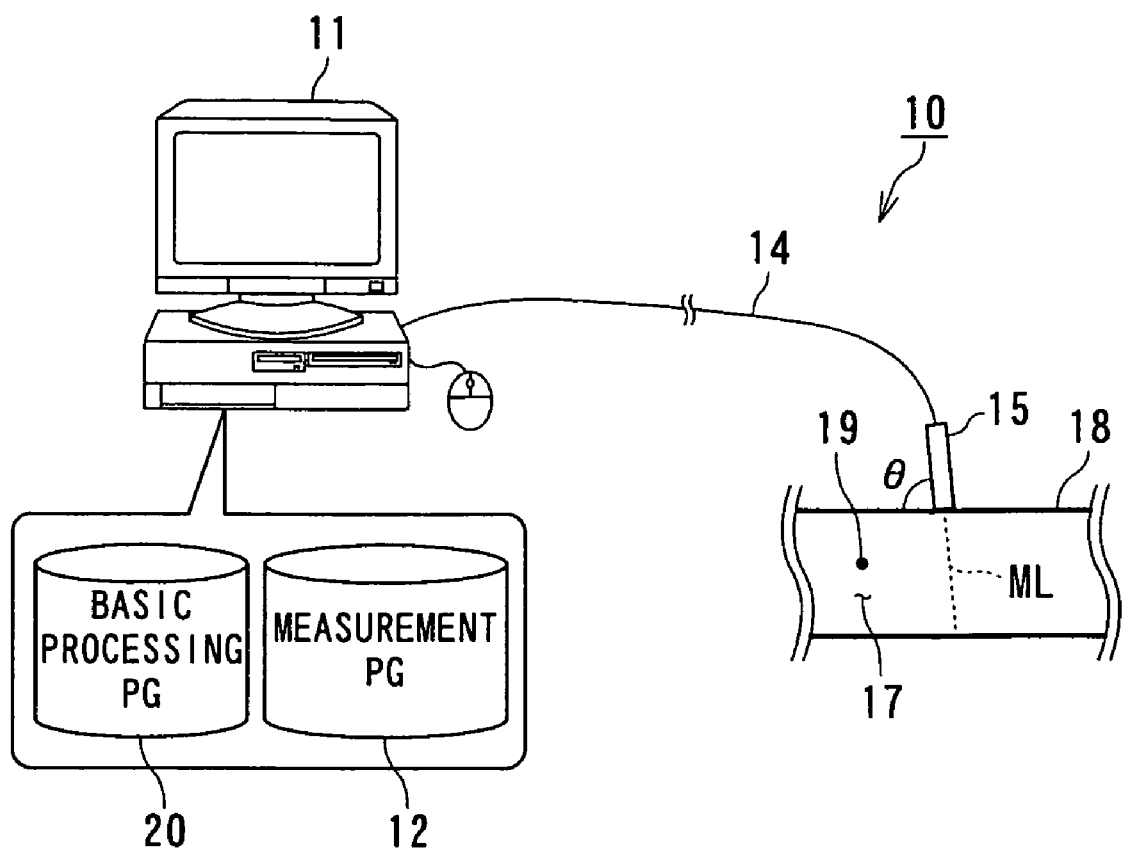
FIG. 1 is a schematic diagram which shows a configuration of an ultrasonic flow-speed distributor and flowmeter according to an embodiment of the present invention and of a experimental equipment for measuring the flow-speed distribution of a fluid and the flow thereof.

FIG. 1 is a schematic configuration diagram of a measurement system, which schematically shows an ultrasonic flow-speed distributor and flowmeter according to an embodiment of the present invention.

An ultrasonic flow-speed distributor and flowmeter 10 shown in FIG. 1 comprises a personal computer 11 serving as a portable computer, and an ultrasonic flow-speed distribution and flow measurement program (which will be referred to as "measurement PG" in the drawings, as well as "program" being abbreviated to "PG") 12 capable of being read and executed by the personal computer 11, and functions as an ultrasonic flow-speed distributor and flowmeter due to cooperation between the personal computer 11 and the ultrasonic flow-speed distribution and flow measurement PG 12.

The personal computer 11 shown in FIG. 1 is connected to a transducer 15 serving as ultrasonic pulse oscillating means and receiving means via a connector cable 14. This transducer 15 is installed (attached) in a metal tube 18 serving as a fluid tube for guiding a fluid to be measured 17 serving as a measured fluid from outside with a predetermined installation (attachment) angle θ. The fluid 17 which flows within the metal tube 18 is suspended (mixed) with an infinite number of ultrasonic reflectors 19.

The transducer 15 is generally installed in the metal tube 18 via an acoustic coupler to match acoustic impedance though the acoustic coupler is not shown in FIG. 1.

The ultrasonic flow-speed distribution and flow measurement PG 12 is stored in recording means such as a hard disk built in the personal computer 11. The personal computer 11 can read out the ultrasonic flow-speed distribution and flow measurement PG 12 stored in the recording means, and can execute the program.

Note that at the time of measuring an ultrasonic flow-speed distribution and flow, a basic processing PG 20, which is preset, realizes various types of functions regarding the processing operations going along with control of the frequency of ultrasonic pulses which the transducer 15 transmits, and measurement such as gain adjustment at the time of receiving reflected waves (hereinafter, referred to as basic processing operations), for example. The basic processing PG 20 is recorded and stored in recording means which can be read by the personal computer 11, as with the ultrasonic flow-speed distribution and flow measurement PG 12.

[Function Blocks]

Figure 2:
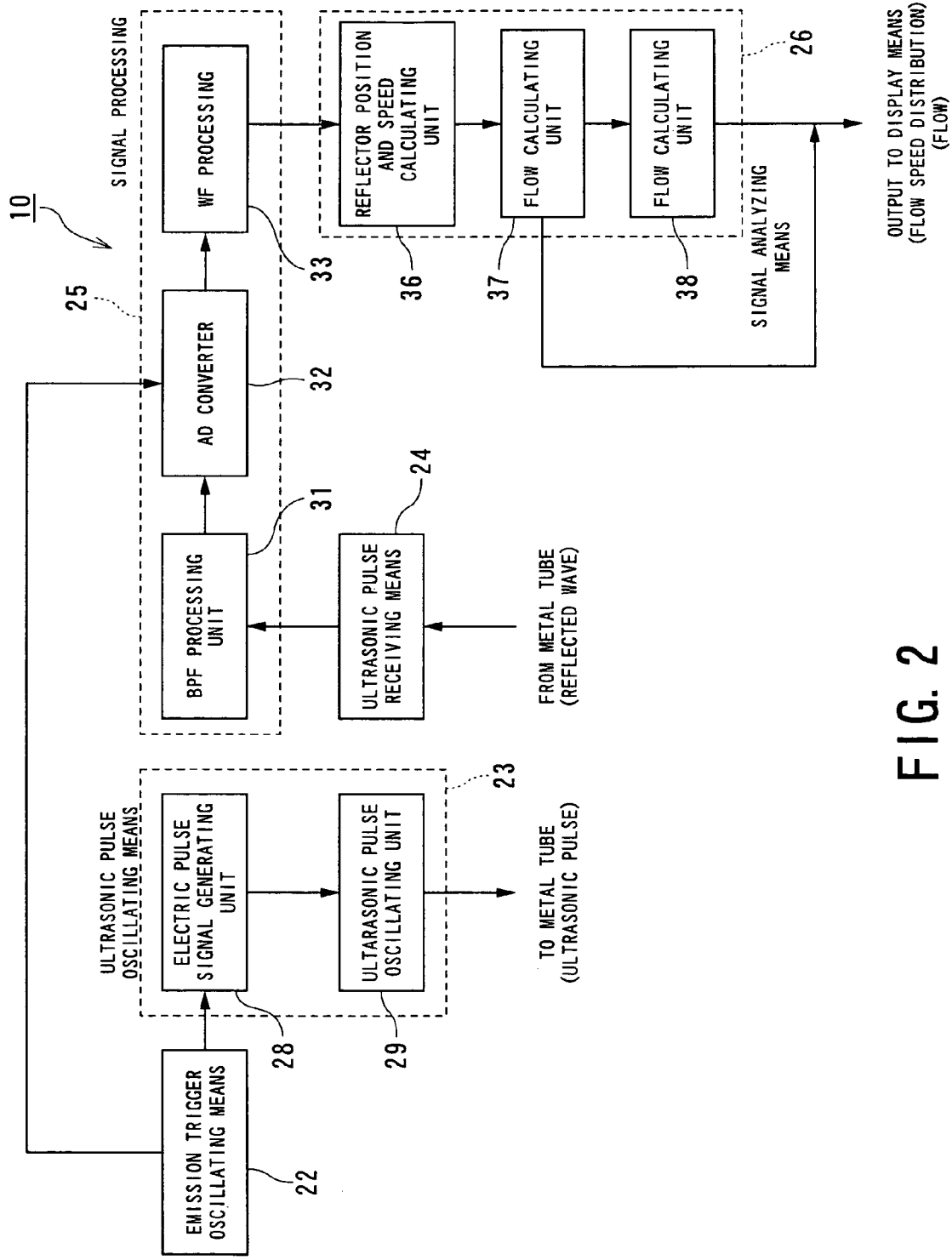
FIG. 2 is a function block diagram of an ultrasonic flow-speed distributor and flowmeter according to the present invention.

FIG. 2 illustrates a function block diagram of the ultrasonic flow-speed distributor (hereinafter, referred to as ultrasonic flow-speed distributor) and flowmeter 10 according to an embodiment of the present invention.

The ultrasonic flow-speed distributor and flowmeter 10 shown in FIG. 2 functionally describes the ultrasonic flow-speed distributor and flowmeter 10 shown in FIG. 1, which functions as an ultrasonic flow-speed distributor and flowmeter by the personal computer 11 and the ultrasonic flow-speed distribution and flow measurement PG 12 shown in FIG. 1 cooperating.

The ultrasonic flow-speed distributor and flowmeter 10 shown in FIG. 2 comprises emission trigger oscillating means 22 for outputting an emission trigger signal (electric signal), ultrasonic pulse oscillating means 23 for receiving the emission trigger signal, and oscillating ultrasonic pulses, ultrasonic receiving means 24 for receiving the reflected waves of the ultrasonic pulses, and converting the received reflected waves of the ultrasonic pulses into electric signals, signal processing means 25 for performing the signal processing of the electric signals, and signal analyzing means 26 for analyzing the received signals, and calculating the ultrasonic flow-speed distribution and flow thereof.

The emission trigger oscillating means 22 includes an emission trigger oscillating function. This emission trigger oscillating function is realized by the personal computer 11 shown in FIG. 1 and the basic processing PG 20 cooperating.

Here, the term "emission trigger" means a trigger (external trigger) oscillated by trigger oscillating means separately provided as to calculation processing means (omitted in FIG. 1) such as a CPU (Central Processing Unit) built into the personal computer 11, for example. That is to say, "emission trigger" is a trigger which is not controlled under an internal clock, unlike with a trigger which is oscillated by the CPU using the internal clock.

The emission trigger oscillating means 22 is configured, for example, by connecting a board including a trigger oscillating function (hereinafter, referred to as trigger oscillating board) with a mother board (omitted in FIG. 1) built in the personal computer 11, and the emission trigger oscillating function is realized by the CPU mounted on the mother board functioning the trigger oscillating board.

The emission trigger oscillating means 22 oscillates an emission trigger signal (electric signal), and then outputs the oscillated emission trigger signal (hereinafter, simply referred to as trigger signal) to the ultrasonic pulse oscillating means 23 and the signal processing means 25. The trigger signal input to the ultrasonic pulse oscillating means 23 is used in the event that the ultrasonic pulse oscillating means 23 oscillates ultrasonic waves. Further, the trigger signal input to the signal processing means 25 is used for controlling the timing of sending/receiving a signal.

The output waveform of the trigger signal output from the emission trigger oscillating means 22 can be set arbitrary by a measuring person inputting setting conditions to the personal computer 11, such that the measuring person performing input operations of setting conditions from input means (omitted in FIG. 1) of the personal computer 11 shown in FIG. 1, for example. Upon the setting conditions being input to the personal computer 11, calculation processing means such as the CPU built in the personal computer 11 recognize the setting conditions that was input, read out and execute the basic processing PG 20 to perform output of the trigger signal in accord with the setting conditions that was input.

The ultrasonic pulse oscillating means 23 shown in FIG. 2 comprise an electric pulse signal generating unit 28 for generating an electric pulse signal having a predetermined frequency (basic frequency $f_0$) in each predetermined time ($\tau$) interval based on the trigger signal that was input, and an ultrasonic pulse generating unit 29 for generating ultrasonic pulses according to the frequency and time interval of the received electric pulse signal.

The electric pulse signal generating unit 28 of the ultrasonic pulse oscillating means 23 includes an electric pulse signal generating function. This electric pulse generating function is realized by the personal computer 11 shown in FIG. 1 and the basic processing PG 20 cooperating.

When the ultrasonic pulse oscillating means 23 shown in FIG. 2 receive the trigger signal output from the emission trigger oscillating means 22, the electric pulse signal oscillating unit 28 generates an electric pulse signal having a predetermined frequency, such as a basic frequency $f_0$ of 1 MHz, 2 MHz, 4 MHz, or the like, at predetermined time $\tau$ intervals, for example. The electric pulse signal generating unit 28 includes a digital synthesizer, can output an electric pulse signal in a range between 50 kHz and 20 MHz, and can keep up with the transducer 15 having various types of oscillating frequency property. The electric pulse signal generated in the electric pulse signal generating unit 28 is output to the ultrasonic pulse generating unit 29.

The ultrasonic pulse generating unit 29 includes an ultrasonic pulse generating function. This ultrasonic pulse generating function is realized by the ultrasonic pulse generating function included in the transducer 15 shown in FIG. 1.

Reception of the electric pulse signal at the ultrasonic pulse oscillating unit 29 is performed by the transducer 15 connected to the personal computer 11 shown in FIG. 1 via the connector cable 14 receiving the electric pulse signal output from the personal computer 11. When the ultrasonic pulse oscillating unit 29 receives the electric pulse signal generated by the electric pulse signal oscillating unit 28, the ultrasonic pulse oscillating unit 29 converts the received electric pulse signal into ultrasonic pulses, and then transmits the obtained ultrasonic pulses to the fluid 17 via metal tube 18.

As shown in the schematic configuration diagram in FIG. 1, the transducer 15 is installed in the metal tube 18 from outside with the predetermined installation angle θ. The ultrasonic pulses transmitted from the transducer 15 are cast into the fluid 17 flowing within the metal tube 18 along a measurement line ML shown in FIG. 1. Subsequently, the ultrasonic pulses are reflected off the ultrasonic reflectors 19 mixed in the fluid 17. The reflected waves reflected by the ultrasonic reflectors 19 return to the transducer 15.

The transducer 15 shown in FIG. 1 serves as the ultrasonic receiving means 24 along with the ultrasonic pulse generating unit 29 of the ultrasonic pulse oscillating means 23 shown in FIG. 2. The ultrasonic receiving means 24 receives the reflected waves of the returned ultrasonic pulses, and convert these into an ultrasonic echo signal (analog electric signal) according to the size of the received reflected waves. The ultrasonic echo signal obtained by the conversion is transmitted to the signal. processing means 25.

The signal processing means 25 shown in FIG. 2 comprises a BPF processing unit 31 for performing filtering processing (hereinafter, referred to as band-pass filtering processing, i.e., BPF processing) so as to extract the same frequency band as the ultrasonic waves used, of the received ultrasonic echo signals, an AD converter 32 for converting the ultrasonic echo signal which is an analog signal into a digital signal (hereinafter, referred to as AD conversion), and a WF processing unit 33 for performing filtering processing using a wall filter (hereinafter, referred to as WF) so as to reduce a clutter noise component to be superimposed on the received ultrasonic echo signal.

With the signal processing means 25 shown in FIG. 2, a signal processing function is realized by the personal computer 11 shown in FIG. 1 and the basic processing PG 20 cooperating. More specifically, upon the signal processing means 25 receiving the ultrasonic echo signal serving as reflected waves, first, the ultrasonic echo signal is input to the BPF processing unit 31. Then, the BPF processing unit 31 performs the BPF processing.

The BPF processing unit 31 comprises, for example, a low-pass filter (LPF) and a high-pass filter (HPF), or a band-pass filter (BPF), and extracts only the frequency band of the ultrasonic pulses used for measurement from the ultrasonic echo signal serving as reflected waves from the ultrasonic reflectors 19. As a result of performing the BPF filtering processing, since noise included in the ultrasonic echo signal is suppressed, adverse affects due to noise included in frequency components not used for measurement on flow-speed distribution and flow measurement are prevented.

After the BPF processing of the ultrasonic echo signal is completed at the BPF processing unit 31, next, the ultrasonic echo signal is input to the AD converter 32. The AD converter 32 serves as AD converting means for performing digital sampling regarding the received ultrasonic echo signal at high speed, and converting the analog signal into a digital signal.

The AD-converted digital signal is temporally stored in, for example, memory (omitted in FIG. 1) built in the personal computer 11 as digital data. The digital data stored in the memory can be recorded in recording means which can be read by the personal computer 11, such as a hard disk built into the personal computer 11, flexible disk, CD-ROM, DVD-ROM, or MO, for example. In addition, the resolution of the AD converter 32 can be increased to, for example, the sampling frequency of 500 MHz per 8 bits.

Upon completion of converting the analog ultrasonic echo signal into digital ultrasonic echo signal by the AD conversion, next, the AD converter 32 transmits the ultrasonic echo signal to the WF processing unit 33. The WF processing unit 33, which comprises a WF, subjects the received ultrasonic echo signal to the WF processing. Clutter noise to be superimposed on the ultrasonic echo signal is reduced by the WF processing unit 33 subjecting the ultrasonic echo signal to the WF processing, thereby preventing adverse effects due to clutter noise on flow-speed distribution and flow measurement.

Upon completion of subjecting the ultrasonic echo signal to the WF processing, all of the signal processing to be performed at the signal processing means 25 shown in FIG. 2 is completed. The ultrasonic echo signal subjected to the signal processing at the signal processing means 25 is input to the signal analyzing means 26 and then the input ultrasonic echo signal is analyzed by the signal analyzing means 26. The signal analyzing means 26 calculates the flow-speed distribution and flow of the fluid 17 flowing within the metal tube 18 shown in FIG. 1 by analyzing the input ultrasonic echo signal.

With the signal analyzing means 26 shown in FIG. 2, a signal analyzing function is realized by the personal computer 11 shown in FIG. 1, the ultrasonic flow-speed distribution and flow measurement PG 12, and the basic processing PG 20 cooperating.

The signal analyzing means 26 comprises a reflector position-and-speed calculating unit 36 for calculating the position and speed of the ultrasonic reflectors 19 within the fluid 17 shown in FIG. 1, a flow-speed distribution calculating unit 37 for calculating the flow-speed distribution of the fluid from the positions and speeds of a great number of ultrasonic reflectors (hereinafter, referred to as ultrasonic reflector group) calculated by the reflector position-and-speed calculating unit 36, and a flow calculating unit 38 for calculating the flow of the fluid 17 from the flow-speed calculated by the flow-speed distribution calculating unit 37.

The reflector position-and-speed calculating unit 36 calculates the positions and speeds of the ultrasonic reflectors 19 mixed in the fluid 17 from the ultrasonic echo signal input. With calculation of the positions and speeds of the ultrasonic reflectors 19, for example, in the event of the ultrasonic reflectors 19 in the fluid 17 flowing within the metal tube 18 shown in FIG. 1, different positions on the measurement line ML are calculated with a certain pitch (hereinafter, referred to as measurement pitch), and a several number of the speeds of the ultrasonic reflectors 19 are calculated as to one position.

The position and speed calculating processing of the ultrasonic reflectors 19 is performed by the calculating processing means such as the CPU of the personal computer 11 executing the ultrasonic flow-speed distribution and flow measurement PG 12. Here, the measurement pitch is principally determined by the resolution (sampling frequency) of the AD converter 32, so is set before measurement according to the inner diameter D of the metal tube 18, and the type of the fluid 17 while considering the resolution of the AD converter 32.

The flow-speed distribution calculating unit 37 obtains a speed distribution by plotting the position and speed of the ultrasonic reflector group calculated by the reflector position-and-speed calculating unit 36. The position-and-speed plotting processing of the ultrasonic reflector group is performed by the calculating processing means such as the CPU of the personal computer 11 executing the ultrasonic flow-speed distribution and flow measurement PG 12.

In the event that the ultrasonic flow-speed distributor and flowmeter 10 shown in FIG. 2 displays only the flow-speed distribution of the fluid 17, the calculating processing means such as the CPU of the personal computer 11 executes the basic processing PG 20 to display the flow-speed distribution data output by the flow-speed distribution calculating unit 37 on the display means capable of display, such as the display of the personal computer 11, as flow-speed distribution.

On the other hand, in the event that the ultrasonic flow-speed distributor and flowmeter 10 shown in FIG. 2 displays a flow-speed distribution and flow, or flow, the flow-speed distribution data calculated by the flow-speed distribution calculating unit 37 is input to the flow calculating unit 38.

The flow calculating unit 38 calculates flow by receiving the flow-speed distribution data calculated by the flow-speed distribution calculating unit 37, and integrating the flow-speed distribution within the metal tube 18 along the internal area of the metal tube 18 using the received flow-speed distribution data. The integral calculating processing for calculating flow is performed by the calculating processing means such as the CPU of the personal computer 11 executing the ultrasonic flow-speed distribution and flow measurement PG 12.

With the ultrasonic flow-speed distributor and flowmeter 10 shown in FIG. 2, when the flow calculating unit 38 completing integral calculating processing (flow calculation), the calculating processing means such as the CPU of the personal computer 11 executes the basic processing PG 20, and the flow calculation data calculated by the flow calculating unit 38 is displayed on the display means capable of display such as the display of the personal computer 11 as flow.

Note that the ultrasonic flow-speed distributor and flowmeter 10 shown in FIG. 1 employs the portable computer serving as means for executing a PG (hereinafter, referred to as PG executing means), but the PG executing means is not restricted to the portable computer. The ultrasonic flow-speed distributor and flowmeter 10 shown in FIG. 1 is an example, so the ultrasonic flow-speed distributor and flowmeter 10 may be configured with, for example, a desktop personal computer which cannot be carry out, a workstation, a mainframe, or the like, as long as the ultrasonic flow-speed distribution and flow measurement PG 12 is executable.

In addition, the emission trigger oscillating means 22, the ultrasonic pulse oscillating means 23, the electric pulse signal generating unit 28 of the ultrasonic receiving means 24, the signal processing means 25, and the signal analyzing means 26 may not always be configured such that only the personal computer 11 is cooperated with the PG. For example, a trigger oscillating unit serving as the emission trigger oscillating means 22, which is driven by a signal output from the personal computer 11, may be provided outside of the personal computer 11.

[Measurement of the Flow-Speed Distribution and Flow of a Fluid]

Next, description will be made regarding the measurement operation of the flow-speed distribution and flow of a fluid using the ultrasonic low-speed distributor and flowmeter 10.

FIG. 3 is an explanatory diagram representing in more detail the supply source of the fluid to be measured 17, and the perimeter of the metal tube 18 in the schematic configuration diagram of the ultrasonic flow-speed distributor and flowmeter 10 shown in FIG. 1.

For example, as shown in FIGS. 3A and 3B, the transducer 15 is installed from outside in a position of x=19D (19-fold inner diameter D) in the tube-axis direction (x axial direction) from the tube start position (x=0) of the metal tube illustrated in FIG. 3 using the stainless steel tube 18a of which the inner diameter D is 41.2 mm $\phi$, and the radial thickness is 3.7 mm. At the time of installation, the transducer 15 is disposed in water at an inclined angle $\theta$ as to the tube axis of the stainless steel tube 18a (metal tube 18). The transducer 15 is attached to the metal tube 18 (stainless steel tube 18a) via an acoustic coupler, and is guided such that the ultrasonic pulses oscillated from the transducer 15 smoothly cast into the metal tube 18.

Reference numeral 41 denotes an overflow tank, reference numeral 42 denotes a contraction device, and reference numeral 43 denotes a fluid tube installation container for installing the stainless steel tube 18a of an experiment region under the water. The water is employed in the present experiment facility as the fluid to be measured 17. Further, F shown in the drawing indicates the direction of the water flow.

With the ultrasonic flow-speed distributor and flowmeter 10 shown in FIG. 1, the signal analyzing means 26 performs signal analysis based on the cross-correlation method. The cross-correlation method is a method for computing the cross-correlation between two reflected waves (reference waves, search waves) obtained with a certain time interval, and deriving the speed distribution of the fluid along the measurement line ML from the computed result. Time resolution can be exponentially improved as compared to the conventional Doppler ultrasonic flowmeter by performing flow measurement using the present method.

The flow-speed distribution and flow measuring method using the ultrasonic flow-speed distributor and flowmeter 10 will be described with reference to FIG. 1 and FIG. 2.

The flow-speed distribution and flow measuring method using the ultrasonic flow-speed distributor and flowmeter 10 comprises a emission trigger oscillating procedure, an ultrasonic oscillating procedure, an ultrasonic pulse receiving procedure, a signal processing procedure, and a signal analyzing procedure. If we describe the procedures of this flow-speed distribution and flow measuring method in order focusing on the function block diagram shown in FIG. 2, with the ultrasonic flow-speed distribution and flow measuring method, first, the emission trigger oscillating procedure is performed, which comprises an electric pulse signal generating process for receiving a trigger signal to generate an electric pulse signal, and an ultrasonic pulse generating process for converting the electric pulse signal generated in this electric pulse signal generating process into an ultrasonic pulse, which is then emitted.

With the emission trigger oscillating procedure, the trigger signal (electric signal) oscillated by the emission trigger oscillating means 22 is transmitted to the electric pulse signal generating unit 28 of the ultrasonic pulse oscillating means 23, and the AD converter 32 of the signal processing means 25. The trigger signal is used for matching the point-in-time of receiving the ultrasonic echo signal, and the point-in-time of starting AD conversion, i.e., for synchronization.

Next, when the electric pulse signal generating unit 28 receives the trigger signal transmitted from the emission trigger oscillating means 22, the electric pulse signal generating unit 28 generates, as the electric pulse signal generating process, an electric pulse signal, and transmits the generated electric pulse signal to the ultrasonic pulse generating unit 29. The ultrasonic pulse generating unit 29 converts the received electric pulse signal into ultrasonic pulses, as the ultrasonic pulse generating process, and emits the obtained ultrasonic pulses.

The above procedures from oscillation of the trigger signal (electric signal) in the emission trigger oscillating procedure until emission of the ultrasonic pulses in the ultrasonic pulse generating procedure have been described focusing on the function blocks shown in FIG. 2; next, this will be described focusing on the measurement system configuration shown in FIG. 1.

The procedures from oscillation of the trigger signal (electric signal) in the emission trigger oscillating process until transmission of the ultrasonic pulses in the ultrasonic pulse generating process are performed by the personal computer 11 and the ultrasonic flow-speed distribution and flow measurement PG 12 cooperating.

The generated electric pulse signal is transmitted from the personal computer 11 to the transducer 15 connected thereto via the connector cable 14, and the transducer 15 receives the electric pulse signal. The transducer 15 receives the electric pulse signal, for example, converts this into an ultrasonic burst signal in a sine wave shape of 4 MHz, and performs oscillation of the ultrasonic pulses.

While the transducer 15 projects the ultrasonic pulse beam in the metal tube 18, the transducer 15 starts reception of the reflected waves from the ultrasonic reflectors 19 such as bubbles and particles mixed in the fluid to be measured 17 following oscillation of the ultrasonic pulses, and receives the ultrasonic echo signal of the obtained reflected waves. The received ultrasonic echo signal is transmitted from the transducer 15 to the personal computer 11 connected thereto via the connector cable 14.

When the personal computer 11 receives the ultrasonic echo signal, the personal computer 11 and the ultrasonic flow-speed distribution and flow measurement PG 12 cooperate to perform the signal processing and signal analysis of the received ultrasonic echo signal. Description will be made regarding the signal processing and signal analysis of the received ultrasonic echo signal performed by the personal computer 11 and the ultrasonic flow-speed distribution and flow measurement PG 12 cooperating with reference to FIG. 2.

The signal processing means 25 perform the signal processing serving as the signal processing procedure regarding the ultrasonic echo signal received by the ultrasonic receiving means 24. The signal processing procedure performed by the signal processing means 25 comprises a BPF processing process for subjecting the ultrasonic echo signal to BPF processing according to the ultrasonic frequency thereof, an AD conversion process for subjecting the ultrasonic echo signal following the BPF processing to the AD conversion, and a WF processing process for subjecting the digital ultrasonic echo signal to WF processing.

As for the signal processing procedure performed by the signal processing means 25, first, as the BPF processing process, the BPF processing unit 31 subjects the ultrasonic echo signal to the BPF processing corresponding to the ultrasonic frequency thereof, and thus the BPF processing is performed, next, the AD conversion process is performed wherein the AD converter 32 subjects the ultrasonic echo signal input to the AD converter 32 to digital sampling processing at high speed for digitalization.

FIG. 4 shows an explanatory diagram for describing the relation between the trigger signal, the ultrasonic echo signal received waveform, and the sampling timing of the AD converter 32.

In FIG. 4, the horizontal axis represents a time axis, and the vertical axis is a signal level, the upper case illustrates change over time of the trigger signal, the middle case illustrates change over time of the ultrasonic echo signal received waveform, and the lower case illustrates change over time of the sampling timing of the AD converter 32. As shown in the upper case of FIG. 4, a pulse-shaped signal as the trigger signal is continuously output for each predetermined time (τ) interval, for example. The reception of the ultrasonic echo signal and the sampling timing of the AD converter 32 are controlled in sync with the timing of this trigger signal.

As shown in the lower case of FIG. 4, the AD converter 32 subjects the ultrasonic echo signal to digital sampling processing in an extremely short time width, for example, for each 1 μs, and acquires the digital ultrasonic echo signal, i.e., acquires a necessary sequenced number of time-series data (e.g., 512 sequences). Upon the AD converter 32 completing acquisition of a necessary sequenced number of time-series data, the WF processing unit 33 subjects the digital ultrasonic echo signal to the WF processing as the WF processing process.

The WF processing unit 33, as the WF processing process, first, performs a corresponding point-in-time echo level signal acquisition step for acquiring the relation between the number of sequences and the signal level (hereinafter, referred to as corresponding point-in-time echo level signal) from the digitalized ultrasonic echo signal (for the amount of 512 sequences). Then, the WF processing unit 33 performs an FFT processing step for subjecting the corresponding point-in-time echo level signal to Fourier transform using a method such as high Fourier transform (what is called FFT).

Subsequently, the WF processing unit 33 performs a clutter noise reduction processing step for subjecting the frequency equivalent components of the corresponding point-in-time echo level signal obtained in the FFT processing step to filtering processing employing an S/N ratio as a threshold. The clutter noise included in the ultrasonic echo signal is reduced by the filtering processing employing an S/N ratio as a threshold, thereby preventing adverse affects on flow-speed distribution and flow measurement.

Upon the filtering processing employing an S/N ratio as a threshold (clutter noise reduction processing step) being completed, the WF processing unit 33 performs inverse FFT processing for subjecting the frequency components of the corresponding point-in-time echo level signal to inverse Fourier transform as an inverse FFT processing step, following which arrays the digital ultrasonic echo signal (time-series data) in sequenced order again for restructuring, thereby obtaining the digital ultrasonic echo signal of which the clutter noise component is reduced. Upon the inverse FFT processing being completed, the WF processing process is completed, which completes the signal processing procedure of the ultrasonic echo signal. The signal analyzing means 26 subjects the ultrasonic echo signal of which the signal processing is completed to signal analysis as a signal analyzing procedure.

The signal analysis of the ultrasonic echo signal performed by the signal analyzing means 26 as the signal analyzing procedure is, by analyzing the ultrasonic echo signal using the cross-correlation method, to obtain a flow-speed distribution along the measurement line (the diameter direction line of the stainless steel tube 18a) ML of the fluid 17 flowing within the metal tube 18, or to obtain flow by obtaining a flow-speed distribution along the ML, and integrating the obtained flow-speed distribution along the internal area of the stainless steel tube 18a.

The signal analyzing procedure comprises a reflector position-and-speed calculating process for calculating the position and speed of the ultrasonic reflector group within the fluid 17, a flow-speed distribution calculating process for calculating the flow-speed distribution of the fluid from the position and speed of the ultrasonic reflector group within the fluid 17 calculated in the reflector position-and-speed calculating process, and a flow calculating process for calculating flow by subjecting the flow-speed distribution calculated in this flow-speed distribution calculating process to integral calculation along the internal area of the metal tube 18.

With the signal analysis of the ultrasonic echo signal as the signal analyzing procedure, first, the reflector position-and-speed calculating unit 36 calculates the position and speed of the ultrasonic reflector group as the reflector position-and-speed calculating process. Calculation of the position and speed of the ultrasonic reflector group is performed regarding the cross-correlation between the consecutive sequences, i.e., reflected waves (reference waves) 45 included in the n'th sequence and the reflected waves (search waves) 46 included in the n+1'th sequence (n is an integer satisfying $1 \leq n \leq 511$) of the digital ultrasonic echo signal subjected to 512-sequences sampling in an extremely short time width, e.g., for each 1 μs.

With calculation of the cross-correlation between the reference waves 45 and the search waves 46 performed as a cross-correlation calculating processing step, the size of a search window is set using a flexible search window method (the details thereof will be described later), the cross-correlation as to the reference waves 45 in a necessary search range in the search waves 46 is performed from n=1 to n=511. Subsequently, the cross-correlation between the reference waves 45 and the search waves 46 is computed, and in the event that the obtained cross-correlation value is equal to or greater than a steady value (threshold), a phase identifying step for regarding the reflected waves as the reflected waves from the same ultrasonic reflector 19, and subsequently, the phase difference between the reference waves 45 and the search waves 46 identified in the phase difference identifying step is obtained, and a position-and-speed calculating step for calculating the positions and speeds of the ultrasonic reflectors 19 from the phase difference thereof is performed.

Thus, in the event that the cross-correlation value between the reference waves 45 and the search waves 46 is equal to or greater than a steady value (threshold), the reflected waves are regarded as the reflected waves from the same ultrasonic reflector 19, and the position and speed of each ultrasonic reflector 19 which reflected off the ultrasonic waves within the fluid 17 is calculated. Subsequently, the flow-speed distribution calculating unit 37 calculates the flow-speed distribution of the fluid 17 from the position and speed of the ultrasonic reflector group calculated as the flow-speed distribution calculating process.

The flow-speed distribution calculating unit 37 calculates the flow-speed distribution of the fluid to be measured 17 from the obtained position and speed data of the ultrasonic reflector group. Calculation of the flow-speed distribution of the fluid 17 is made wherein the flow-speed of the fluid 17 is regarded as the speed of the ultrasonic reflector group suspended in the fluid 17, and the relation between the position of the metal tube 18 (stainless steel tube 18a) and the speed of the ultrasonic reflector group at the position thereof, i.e., the flow-speed distribution of the fluid 17 within the metal tube 18 is calculated from the obtained position and speed data of the ultrasonic reflector group.

Upon the flow-speed distribution of the fluid 17 being calculated, subsequently, the flow calculating unit 38 calculates flow by integrating the calculated flow-speed distribution of the metal tube 18 along the internal area of the metal tube 18 as the flow calculating process. When the flow calculating unit 38 completes the integration calculating processing (flow calculation), the calculated flow is displayed on the display means capable of displaying such as the monitor of the personal computer 11.

Note that the signal analyzing procedure comprises the reflector position-and-speed calculating process, the flow-speed distribution calculating process, and the flow calculating process, but the signal analyzing procedure may comprise the reflector position-and-speed calculating process, and the flow-speed distribution calculating process. In this case, the ultrasonic flow-speed distributor and flowmeter 10 calculates only the flow-speed distribution of the fluid 17 within the metal tube 18, does not perform calculation of the flow thereof, and the flow-speed distribution is displayed on the display means such as the monitor of the personal computer 11.

[Processing Flow of the Program]

Description will be made regarding the content of the ultrasonic flow-speed distribution and flow measurement processing (hereinafter, referred to as ultrasonic flow-speed distribution and flow measurement processing method) performed by the personal computer 11 executing the ultrasonic flow-speed distribution and flow measurement PG 12 with the ultrasonic flow-speed distributor and flowmeter 10 shown in FIG. 1 along the processing procedures thereof.

Figure 5:
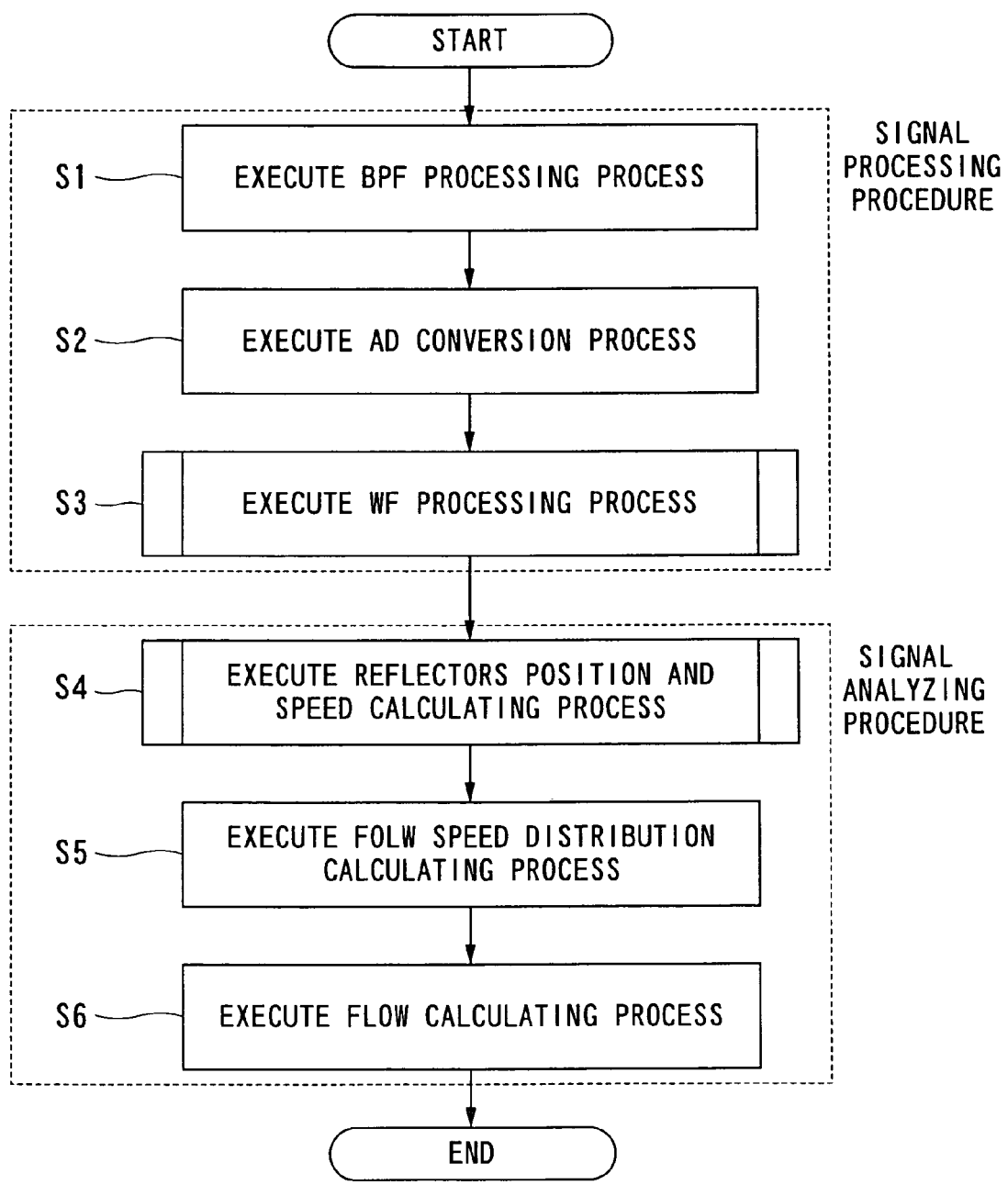
FIG. 5 is a process flowchart for describing the ultrasonic flow-speed distribution and flow measurement processing method performed by the personal computer executing the ultrasonic flow-speed distribution and flow measurement PG with the ultrasonic flow-speed distributor and flowmeter shown in FIG. 1.

FIG. 5 is a process flowchart for describing the ultrasonic flow-speed distribution and flow measurement processing method performed by the personal computer 11 executing the ultrasonic flow-speed distribution and flow measurement PG 12 with the ultrasonic flow-speed distributor and flowmeter 10 shown in FIG. 1.

According to FIG. 5, the ultrasonic flow-speed distribution and flow measurement processing method comprises a signal processing procedure for subjecting the received ultrasonic echo signal to signal processing, and a signal analyzing procedure for obtaining the flow-speed and flow of the fluid 17 by subjecting the ultrasonic echo signal following the signal processing to signal analysis.

The signal processing procedure comprises a BPF processing process for performing BPF processing for extracting the same frequency band as the ultrasonic waves used of the received ultrasonic echo signals, an AD conversion process for subjecting the ultrasonic echo signal to an AD conversion, and a WF processing process for reducing the clutter noise component which is superimposed on the ultrasonic echo signal.

The signal analyzing procedure comprises a reflector position-and-speed calculating process for calculating the position and speed of the ultrasonic reflector group within the fluid to be measured 17, a flow-speed distribution calculating process for calculating the flow-speed distribution of the fluid from the calculated position and speed of the ultrasonic reflector group in the reflector position-and-speed calculating process, and a flow calculating process for calculating the flow of the fluid 17 from the calculated flow-speed distribution in the flow-speed distribution calculating process.

Description will be made regarding the processing content of each processing process of the signal processing procedure and the signal analyzing procedure included the ultrasonic flow-speed distribution and flow measurement processing method.

With the ultrasonic flow-speed distribution and flow measurement processing method shown in FIG. 5, first, the calculating processing means such as the CPU built in the personal computer 11 reads out and executes the ultrasonic flow-speed distribution and flow measurement PG 12, and the ultrasonic flow-speed distribution and flow measurement PG 12 executes the signal processing procedure (step S1 through S3) and the signal analyzing procedure (step S4 through S6).

With the signal processing procedure in the ultrasonic flow-speed distribution and flow measurement processing method, the BPF processing process is performed in step S1, the AD conversion process is performed in step S2, and the WF processing process is performed in step S3.

With the BPF processing process performed in step S1, only the frequency band of the ultrasonic pulses used for measurement is extracted from the ultrasonic echo signal received from the transducer 15 shown in FIG. 1. The frequency bandwidth to be extracted is input and set according to the frequency of the ultrasonic pulses to be used before start of measurement.

The specific processing content of the BPF processing process differs depending on the configuration of the BPF processing unit 31 shown in FIG. 2. For example, in the event of the BPF processing unit 31 comprising a low-pass filter (LPF) and a high-pass filter (HPF), two-step processing comprising low-pass filtering processing and high-pass filtering processing is performed, but in the event of the BPF processing unit 31 comprising a band-pass filter (BPF), one-step processing comprising band-pass filtering processing is performed. However, even in either case, only the frequency band of the ultrasonic pulses used for measurement is eventually extracted.

Upon only the frequency band of the ultrasonic pulses used for measurement being extracted from the ultrasonic echo signal, the BPF processing process (step S1) is completed, and subsequently, the AD conversion process (step S2) is performed. In the AD conversion process performed in step S2, the ultrasonic echo signal subjected to the BPF processing in the BPF processing process in step S1 is subjected to digital sampling to acquire time-series data (e.g., for the amount of 512 sequences). The setting of the number of sampling (e.g., the number of sampling per 1 sequence) is input and set before start of measurement.

Upon digital sampling as to the acquired time-series data being completed, the AD conversion process (step S2) is completed. Upon the AD conversion process (step S2) being completed, subsequently, the WF processing process (step S3) is performed. The WF processing process performed in step S3 is filtering processing using a WF (wall filter) as to the ultrasonic echo signal digitized in the AD conversion process in step S2.

Figure 6:
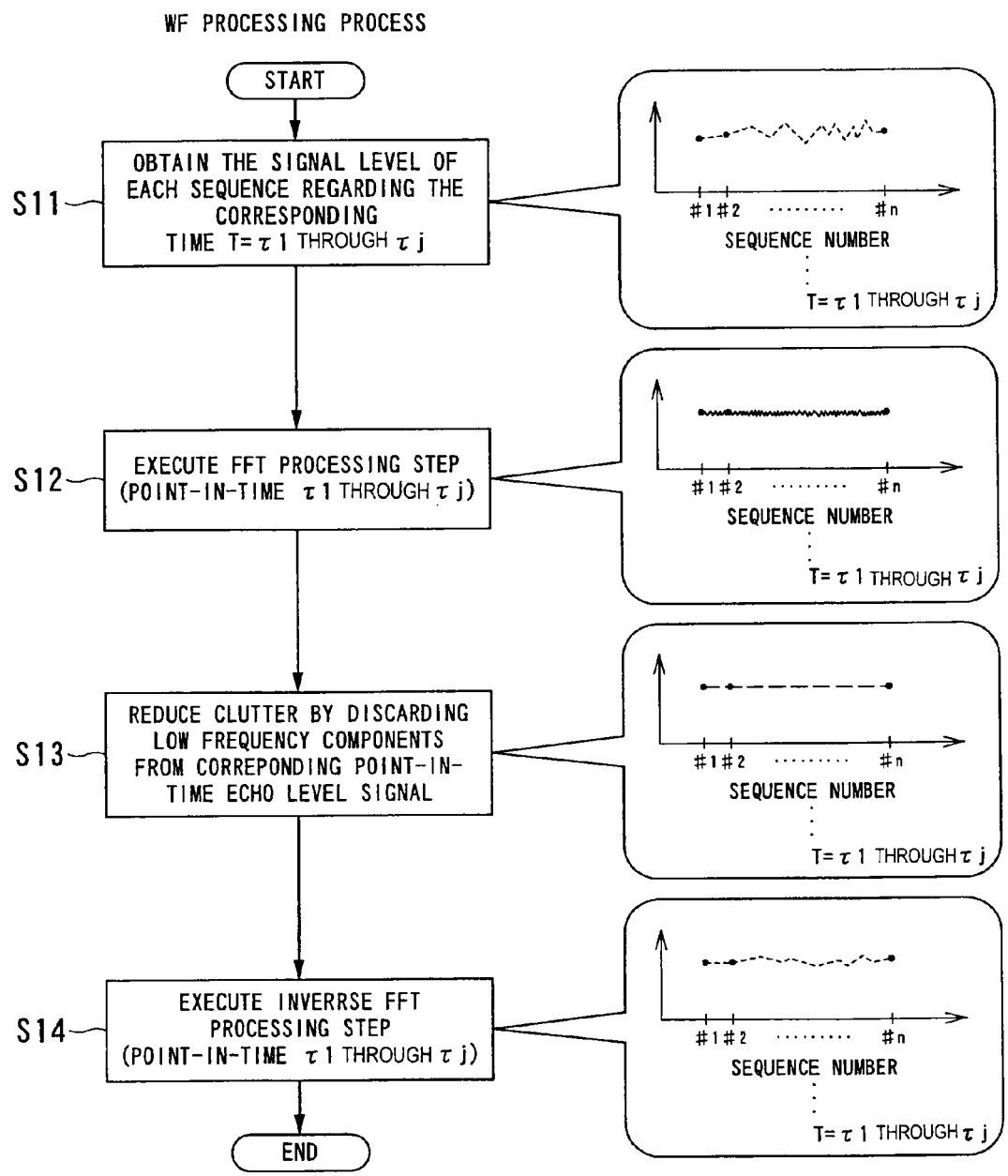
FIG. 6 is a processing flowchart representing more detailed processing steps of the WF processing process in the signal processing procedure.

FIG. 6 shows a processing flowchart representing more detailed processing steps of the WF processing process (step S3) in the signal processing procedure.

According to FIG. 6, the WF processing process in step S3 shown in FIG. 5 comprises, as to each sequence digital ultrasonic echo signal (time-series data), a corresponding point-in-time echo level signal acquisition step (step S11) for obtaining the relation between the number of sequences and the signal level, a FFT processing step (step S12) for subjecting the signal obtained in the corresponding point-in-time echo level signal acquisition step to the FFT (high-speed Fourier transform), a clutter noise reduction processing step (step S13) for subjecting the frequency equivalent components of the signal following the FFT processing to filtering processing of which the S/N ratio is taken as a threshold, and an inverse FFT processing step (step S14) for subjecting the signal following the clutter noise reduction processing step to the inverse FFT processing.

With the WF processing process in step S3, first, a signal level at arbitrary point-in-time corresponding to elapsed time since the start point-in-time of each sequence or the like (hereinafter, referred to as corresponding point-in-time) is acquired from each sequence of the digital ultrasonic echo signal in step S11 (hereinafter, the signals obtained by arraying the acquired signal levels from the sequence number 1 in order are referred to as corresponding point-in-time echo level signals).

Similarly, the signal level of each sequence regarding the corresponding point-in-time $\tau_2$ and so on through $\tau_j$ other than $\tau_1$ (j is an arbitrary integer, but at least $j \geq 3$ in the above example) is obtained as well. Note that the number of corresponding point-in-time to acquire a signal level may be programmed beforehand, or may be input and set before start of measurement. Upon the corresponding point-in-time echo level signals being obtained, the corresponding point-in-time echo level signal acquisition step (step S11) is completed, and subsequently in step S12, the FFT processing step is performed.

With the FFT processing step in step S12, the corresponding point-in-time echo level signal is subjected to the FFT processing to obtain the frequency equivalent components of the corresponding point-in-time echo level signal. Upon the frequency equivalent components of the corresponding point-in-time echo level signal being obtained, the FFT processing step (step S12) is completed, and subsequently in step S13, the clutter noise reduction processing step is performed.

With the clutter noise reduction processing step in step S13, low-frequency equivalent components are discarded from the frequency equivalent components of the corresponding point-in-time echo level signal. Thus, the clutter noise to be superimposed on the ultrasonic echo signal is reduced. The threshold setting of the filtering processing in the clutter noise reduction processing step is input and set before start of measurement.

Upon the clutter noise reduction processing step (step S13) being completed, subsequently, the inverse FFT processing step is performed in step S14, and the frequency components of the ultrasonic echo signal following the clutter noise reduction processing are subjected to the inverse FFT processing to obtain the corresponding point-in-time echo level signal (for the amount of 512 sequences).

Upon the inverse FFT processing step in step S14 being completed to obtain the corresponding point-in-time echo level signal, the WF processing process in step S3 shown in FIG. 5 is completed. Further, upon completion of the WF processing process (step S3), all the processing processes of the signal processing procedure in the ultrasonic flow-speed distribution and flow measurement processing method are completed. Upon the signal processing procedure being completed, subsequently, the signal analyzing procedure (step S4 through step S6) is performed.

The signal analyzing procedure in the ultrasonic flow-speed distribution and flow measurement processing method shown in FIG. 5 comprises a reflector position-and-speed calculating process (step S4) for calculating the positions and speeds of the ultrasonic reflectors 19 within the fluid 17, a flow-speed distribution calculating process (step S5) for calculating the flow-speed distribution of the fluid from the calculated position and speed of the ultrasonic reflector group in the reflector position-and-speed calculating process, and a flow calculating process (step S6) for calculating the flow of the fluid 17 from the flow-speed calculated in the flow-speed distribution calculating process.

With the signal analyzing procedure in the ultrasonic flow-speed distribution and flow measurement processing method, the reflector group position-and-speed calculating process is performed in step S4, the flow-speed distribution calculating process is performed in step S5, and the flow calculating process is performed in step S6.

Figure 7:
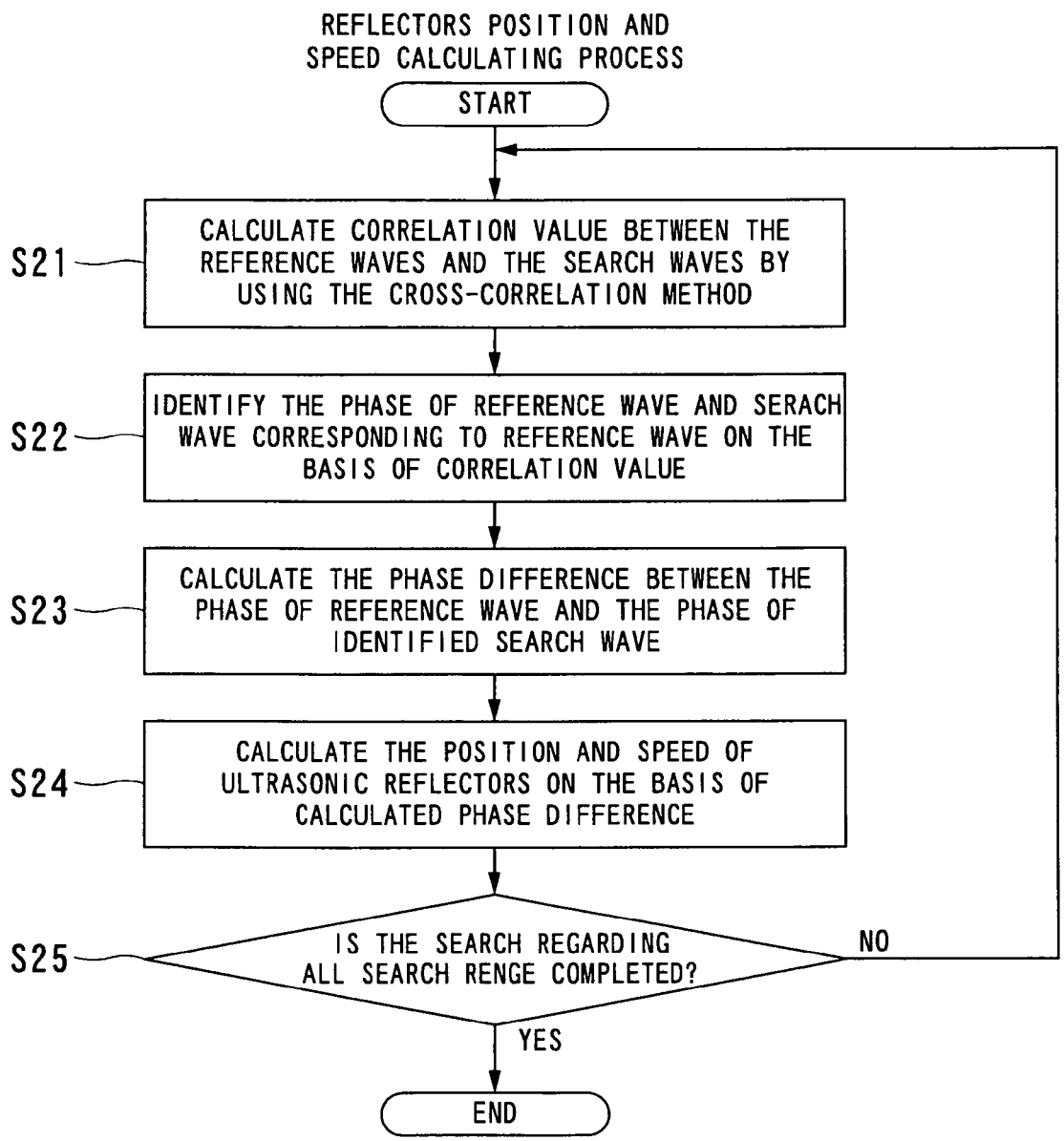
FIG. 7 is a processing flowchart representing more detailed processing steps of the reflector group position-and-speed calculating process in the signal analyzing procedure.

FIG. 7 shows a processing flowchart representing more detailed processing steps of the reflector group position-and-speed calculating process (step S4) in the signal analyzing procedure.

According to FIG. 7, the reflector group position-and-speed calculating process in step S4 shown in FIG. 5 comprises a cross-correlation computing processing step (step S21), a phase identifying step (step S22), a phase difference computing step (step S23), a position-and-speed calculating step (step S24), and a search completion determining step (step S25).

With the reflector group position-and-speed calculating process, first, the cross-correlation computing processing step is performed in step S21, where the cross-correlation between the reference waves 45 and the search waves 46 is computed using the cross-correlation method to calculate a correlation value. Calculation of the correlation value is made wherein the size of the search window of the search waves 46 is set using the flexible search window method (the details thereof will be described later), and the cross-correlation between the search range of the search waves 46 and the reference range of the reference waves 45 is computed. Upon calculation of the correlation value being completed, the cross-correlation computing processing step (step S21) is completed, subsequently, the phase identifying step is performed in step S22.

With the phase identifying step in step S22, the phase of the search waves 46 having the relation wherein the correlation value obtained in the cross-correlation computing processing step (step S21) is equal to or greater than a threshold s is identified. The threshold s is set before execution or at runtime of the PG. The phase identifying step (step S22) is completed, and subsequently, the phase difference computing step is performed in step S23.

With the phase difference computing step in step S23, the phase difference between the phase of the identified search waves 46 and the phase of the referred reference waves 45 is computed. Upon computation of the phase difference being completed, the phase difference computing step (step S23) is completed, and subsequently, the position-and-speed calculating step is performed in step S24.

With the position-and-speed calculating step in step S24, the positions and speeds of the ultrasonic reflectors 19 in the search range of the search waves 46 are calculated from the computed phase difference. Upon calculation of the positions and speeds of the ultrasonic reflectors 19 in the search range of the search waves 46 being completed, the position-and-speed calculating step (step S24) is completed, and subsequently, the search completion determining step is performed in step S25.

With the search completion determining step in step S25, determination is made regarding whether or not search has been completed regarding all of the search ranges to be searched with the search waves 46. In the event that search has not been completed regarding all of the search ranges (in the case of NO in step S25), the flow proceeds to step S21, where the processing steps on and after step S21 are repeated. The position and speed of the ultrasonic reflector group flowing within the fluid 17 are calculated by repeating the processing steps on and after step S21. On the other hand, in the event that search has been completed regarding all of the search ranges (in the case of YES in step S25), the reflector group position-and-speed calculating process ends.

As shown in FIG. 5, upon the reflector group position-and-speed calculating process (step S4) being completed, subsequently, the flow-speed distribution calculating process (step S5) is performed. With the flow-speed distribution calculating process in step S5, the relation between the position and speed of the ultrasonic reflector group, i.e., the flow-speed distribution is calculated from the position and speed of the reflector group calculated in the reflector group position-and-speed calculating process. When calculating the flow-speed distribution, all of the speeds of the ultrasonic reflectors 19 acquired at the same position at the same corresponding point-in-time (e.g., corresponding point-in-time $\tau_1$) in each sequence are subjected to averaging or root-mean-square to calculate the flow-speed distribution.

Upon the flow-speed distribution being calculated, the flow-speed distribution calculating process (step S5) is completed, and subsequently, the flow calculating process (step S6) is performed. With the flow calculating process in step S6, flow is calculated by integrating the calculated flow-speed distribution within the metal tube 18 along the internal area of the metal tube 18. At this time, information necessary for integral computation other than the flow-speed distribution such as the inner diameter D of the metal tube 18 is input and set before the ultrasonic flow-speed distribution and flow measurement processing is performed.

Upon calculation of flow being completed, the flow calculating process (step S6) is completed, and all of the processing processes of the signal analyzing procedure are completed. Upon the signal analyzing procedure being completed, all of the processing procedures in the ultrasonic flow-speed distribution and flow measurement processing method are completed. Display of the ultrasonic flow-speed distribution and flow measurement processing results is performed by the computing processing means such as the CPU built in the personal computer 11 reading out and executing the basic processing PG 20 following completion of all processing procedures of the ultrasonic flow-speed distribution and flow measurement PG 12.

Note that in the event that the ultrasonic flow-speed distributor and flowmeter 10 shown in FIG. 1 performs calculation of flow-speed alone, with the signal analyzing procedure of the ultrasonic flow-speed distribution and flow measurement processing method, the flow calculating process (step S6) is omitted, and display of a flow-speed distribution is performed following completion of the flow-speed distribution calculating process (step S5).

Further, with the above ultrasonic flow-speed distribution and flow measurement processing method, display of the calculated flow-speed distribution or flow is performed by the personal computer 11 reading out and executing the basic processing PG 20, but an arrangement may be made wherein the processing operations until display of the flow-speed distribution and flow can be performed by executing the ultrasonic flow-speed distribution and flow measurement PG 12.

[Measurement Principle of the Ultrasonic Flow-Speed Distributor and Flowmeter]

As shown in FIG. 3, when the transducer 15 of the ultrasonic flow-speed distributor and flowmeter 10 is set to the stainless steel tube 18a present under the water, and water 17 serving as a fluid in which tracer particles 19 serving as ultrasonic reflectors are suspended is poured in the stainless steel tube 18a, the flow-speed distribution of the fluid 17 is measured.

The flow-speed distribution of the fluid 17 is measured by obtaining the speed distribution of the tracer particles (ultrasonic reflectors) 19 within the fluid 17. This is because the tracer particles 19 move along with the flow of the fluid 17, so the speed of the tracer particles 19 can be regarded as the speed of the fluid 17.

Figure 8:
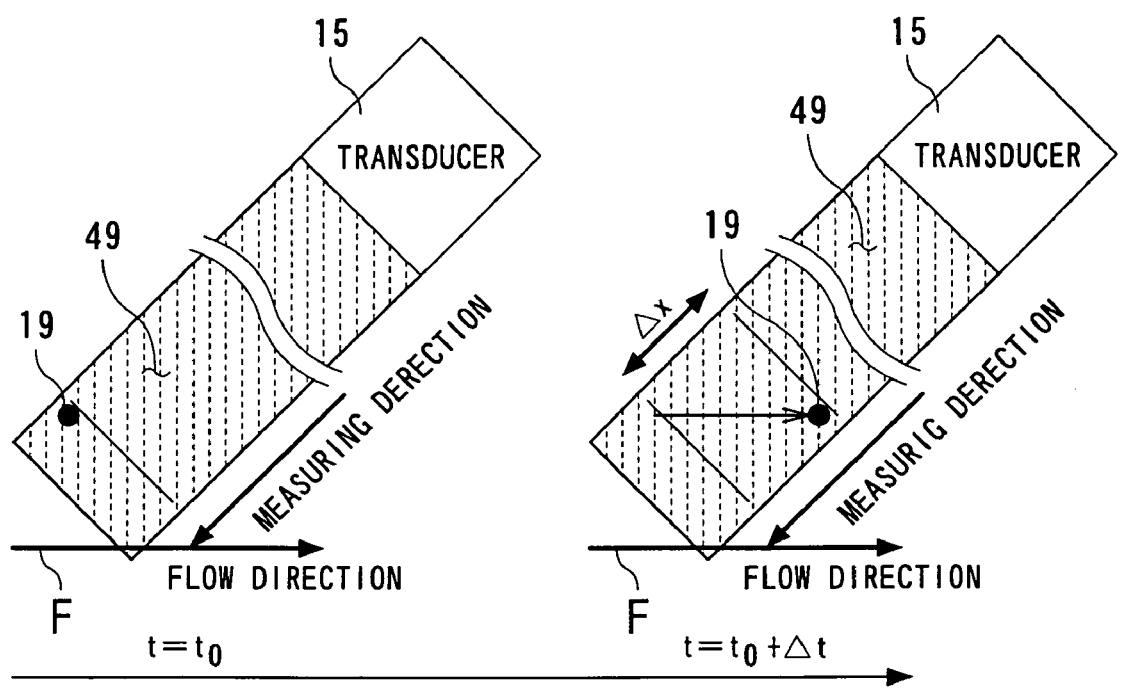
FIG. 8 is an explanatory diagram for describing movement of the tracer particles (ultrasonic reflectors) flowing within the metal tube.

FIG. 8 shows an explanatory diagram for describing movement of the tracer particles 19 flowing within the metal tube 18.

The flow-speed distribution and flow measurement of the fluid 17 in the ultrasonic flow-speed distributor and flowmeter 10 is performed by obtaining the movement amount $\Delta x$ of the tracer particles 19 at point-in-time $t=t_0+\Delta t$, which have been captured at point-in-time $t=t_0$ by ultrasonic waves (hereinafter, referred to as ultrasonic beam) 49 going straight in a beam shape within the fluid 17, as shown in FIG. 8.

When measuring the flow-speed distribution of the fluid 17, upon ultrasonic pulses being transmitted from the piezoelectric element of the transducer 15 along the measurement line ML, the transmitted ultrasonic pulses are reflected off the surfaces of the tracer particles 19 serving as ultrasonic reflectors, and returned to the transducer 15. The reflected waves occur in various places of the fluid field within the stainless steel tube 18a, so the reflected waves emerge such as shown in FIG. 9.

Figure 9:
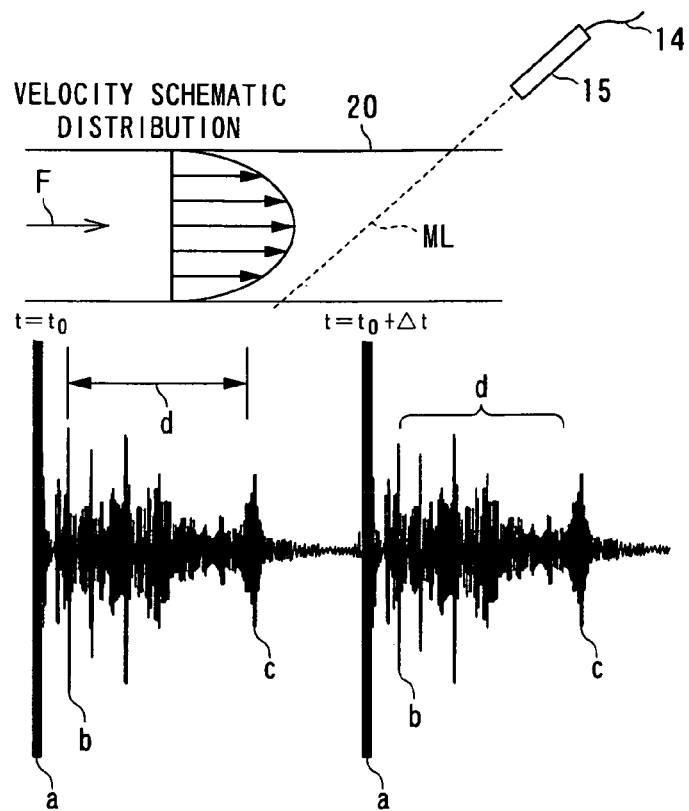
FIG. 9 is an explanatory diagram for describing regarding the ultrasonic echo signal serving as the reflected waves of the ultrasonic pulses oscillated from the transducer of the ultrasonic flow-speed distributor and flowmeter according to the present invention.

FIG. 9 is an explanatory diagram for describing regarding the ultrasonic echo signal serving as the reflected waves of the ultrasonic pulses oscillated from the transducer of the ultrasonic flow-speed distributor and flowmeter according to the present invention.

In FIG. 9, the ultrasonic burst signal (ultrasonic echo signal) "a" emerging first is called an emission region, which is a signal caused by vibration of the piezoelectric element remaining immediately following oscillation of ultrasonic waves. An ultrasonic burst signal b emerging next according to the upper portion of the tube is a signal caused by difference of acoustic impedance between the water and stainless steel, and an ultrasonic burst signal c according to the lower portion of the tube is the same as the signal b. A signal d between the ultrasonic burst signals b and c includes fluid flow-speed information within the stainless steel tube 18a, and the tracer particles 19 exist at peaks thereof.

The positions of the tracer particles 19 are obtained from the ultrasonic burst signal d serving as reflected waves. If we say that the distance from the transducer 15 to the tracer particle 19 is x, the elapsed time since oscillation of ultrasonic pulses until reception of reflected waves is $\tau$, and the speed of ultrasonic waves is c, the following relation holds.

[Expression 1] (1)

$$x = \frac{c\tau}{2}$$

Upon this oscillation of ultrasonic pulses and reception of reflected waves being performed again following a time interval $\Delta t$, the same reflected waves can be obtained, but upon the fluid 17 moving during the time interval $\Delta t$, the tracer particle 19 also moves in a slaved tracking manner. Consequently, the elapsed time $\tau$ until reception of reflected waves also changes.

Figure 10:
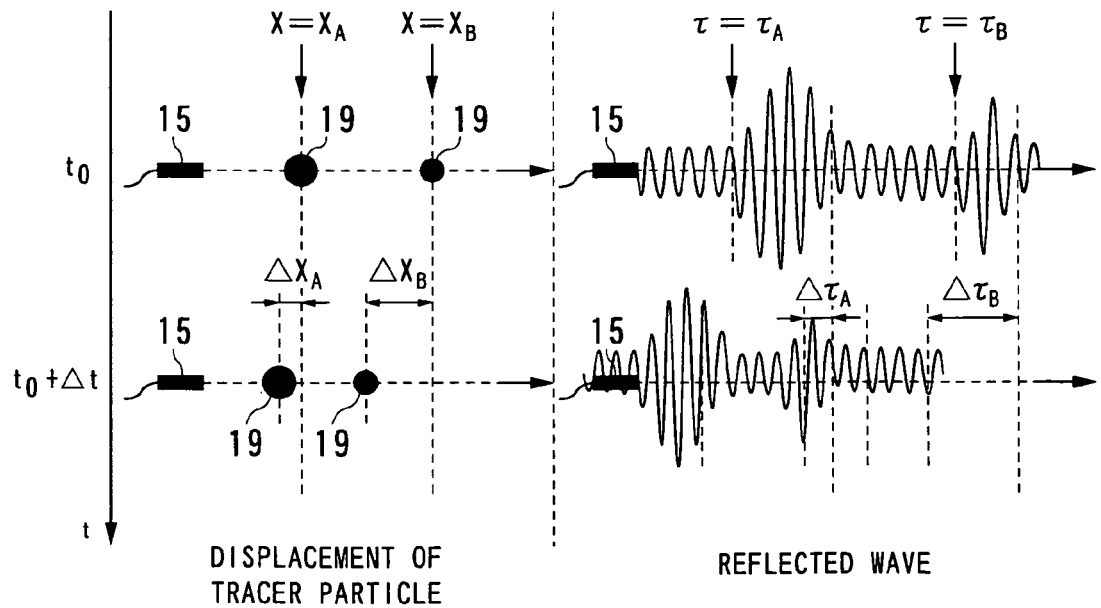
FIG. 10 is an explanatory diagram for describing measurement principle for measuring the flow-speed of a fluid using the cross-correlation method.

FIG. 10 is an explanatory diagram for describing measurement principle for measuring the flow-speed of a fluid using the cross-correlation method.

As shown in FIG. 10, if we say that x is the distance from the transducer, $\Delta x$ is the movement amount of the tracer particle 19 which has moved during $\Delta t$, $\tau$ is the time delay since the ultrasonic pulses have been emitted, and $\Delta \tau$ is the time delay changed during $\Delta t$ since the ultrasonic pulses have been emitted, x directional speed u(x) at a certain position x is represented with the following expression.

[Expression 2] (2)

$$u(x) = \frac{\Delta x}{\Delta t} = \frac{c \cdot \Delta \tau}{2 \cdot \Delta t}$$

Reflection of the ultrasonic pulses occurs in various places on the measurement line ML, so the flow-speed measurement of the fluid on this measurement line ML can be performed simultaneously, thereby obtaining the flow-speed distribution of the fluid.

In the event that the flow-speed distribution measurement of the fluid is performed n times (however, n is a positive integer satisfying n≧2) in the time interval $\Delta t$ by consecutively inputting pulse signals, n−1 sheet of the consecutive flow-speed distribution data of time resolution $\Delta t$ can be acquired.

[Cross-Correlation Function]

Incidentally, the reflected waves due to the tracer particles 19 are, by sufficiently reducing the oscillation interval $\Delta t$ of the ultrasonic pluses as to the flow-speed fluctuation scale of the fluid, generally stored during the time interval (oscillation interval) $\Delta t$.

Following the analog ultrasonic echo signal of the input reflected waves being subjected to high-sampling processing to be converted into digital signal at the AD converter 32, the signal processing mean 25 of the ultrasonic flow-speed distributor and flowmeter 10 computes the cross-correlation function of two reflected waves obtained with the oscillation interval $\Delta t$ of the ultrasonic pulses. For the purpose of distinguishing reflection from the same ultrasonic reflector 19 within the fluid 17, by setting a threshold as to the maximum value set as cross-correlation, or a threshold as to the shape storage stability of cross-correlation, determination can be made regarding whether or not reflection is reflection from the same tracer particle group based on a quantified numeric value.

Generally, a cross-correlation function ($R(\epsilon, \tau)$) is defined as follows.

[Expression 3] (3)

$$R(\epsilon, \tau) = \frac{\sum_{i=-m/2}^{m/2} (A_{ref}(\tau+i) - \overline{A_{ref}(\tau)})(A_{int}(\tau+i+\epsilon) - \overline{A_{int}(\tau+\epsilon)})}{\sqrt{\sum_{i=-m/2}^{m/2} (A_{ref}(\tau+1) - \overline{A_{ref}(\tau)})^2} \sqrt{\sum_{i=-m/2}^{m/2} (A_{int}(\tau+i+\epsilon) - \overline{A_{int}(\tau+\epsilon)})^2}}$$

Herein, 
$$\overline{A_{ref}(\tau)} = \frac{\sum_{i=-m/2}^{m/2} A_{ref}(\tau+i)}{m} \quad (4)$$

$$\overline{A_{int}(\tau+\epsilon)} = \frac{\sum_{i=-m/2}^{m/2} A_{ref}(\tau+i+\epsilon)}{m} \quad (5)$$

$\tau$ denotes time delay serving as a reference, i denotes a position of within the reference/search window, $\epsilon$ denotes slippage between the reference window and the search window, and m denotes the periodic amount of ultrasonic pulses respectively.

Determination is made quantitatively regarding whether or not reflected waves are the reflected waves from the same tracer particle group using this cross-correlation function $R(\epsilon, \tau)$, each time delay $\tau$ is computed, thereby obtaining the time amount-of-change $\Delta \tau$. That is to say, the time delays $\tau$ of the reflected waves (reference waves) obtained first and the next reflected waves (search waves) are obtained, and the difference (time difference) of the time delays τ of these two reflected waves becomes Δτ.

On the other hand, the arrival time difference Δτ of the reflected waves due to the oscillation interval Δt of the ultrasonic pulses necessary for obtaining the flow-speed distribution speed of the fluid is obtained by using the cross-correlation function of the reflected waves subjected to digital sampling.

This cross-correlation function R(ε, τ) is obtained by scattered reflected waves having a sampling time interval, the shorter the interval Δt is, the more the shape of the pulse reflected waves from the tracer particle group is stored, and accordingly, a technique for obtaining Δτ with a more finely divided mesh is indispensable.

Accordingly, reducing the interval of Δt can be realized by performing interpolation using normal distribution approximation, for example. The peak of the cross-correlation function can be obtained with more finely divided mesh by this interpolation, resulting in improvement of speed resolution as well.

Now, if we say that the maximum value of each correlation value obtained in a scattered manner is $P_k$, and the correlation values theretofore and thereafter are $P_{k-1}$ and $P_{k+1}$ respectively, the following relation holds.

[Expression 4] (6)

$$\Delta \tau = k + \frac{1}{2}\left(\frac{\log(P_{k-1}) - \log(P_{k+1})}{\log(P_{k-1}) - 2\log(P_k) + \log(P_{k+1})}\right)$$

With the ultrasonic flow-speed distributor and flowmeter according to the present invention, speed resolution can be markedly improved by performing signal processing including interpolation using this distribution approximation.

[Clutter Noise Reduction Method Using a Wall Filter]

With the ultrasonic flow-speed distributor and flowmeter 10, in the event of employing the metal tube 18 as a fluid tube for guiding the fluid to be measured 17, upon the flow-speed distribution and flow measurement of the fluid to be measured 17 being performed, a noise component called clutter noise is markedly superimposed on the received ultrasonic echo signal. The erroneous position and speed information of the tracer particle may be obtained due to this noise component. Clutter noise reduction processing using a WF is performed to avoid this. Hereinafter, description will be made regarding the clutter noise reduction processing method using a WF.

Figure 11:
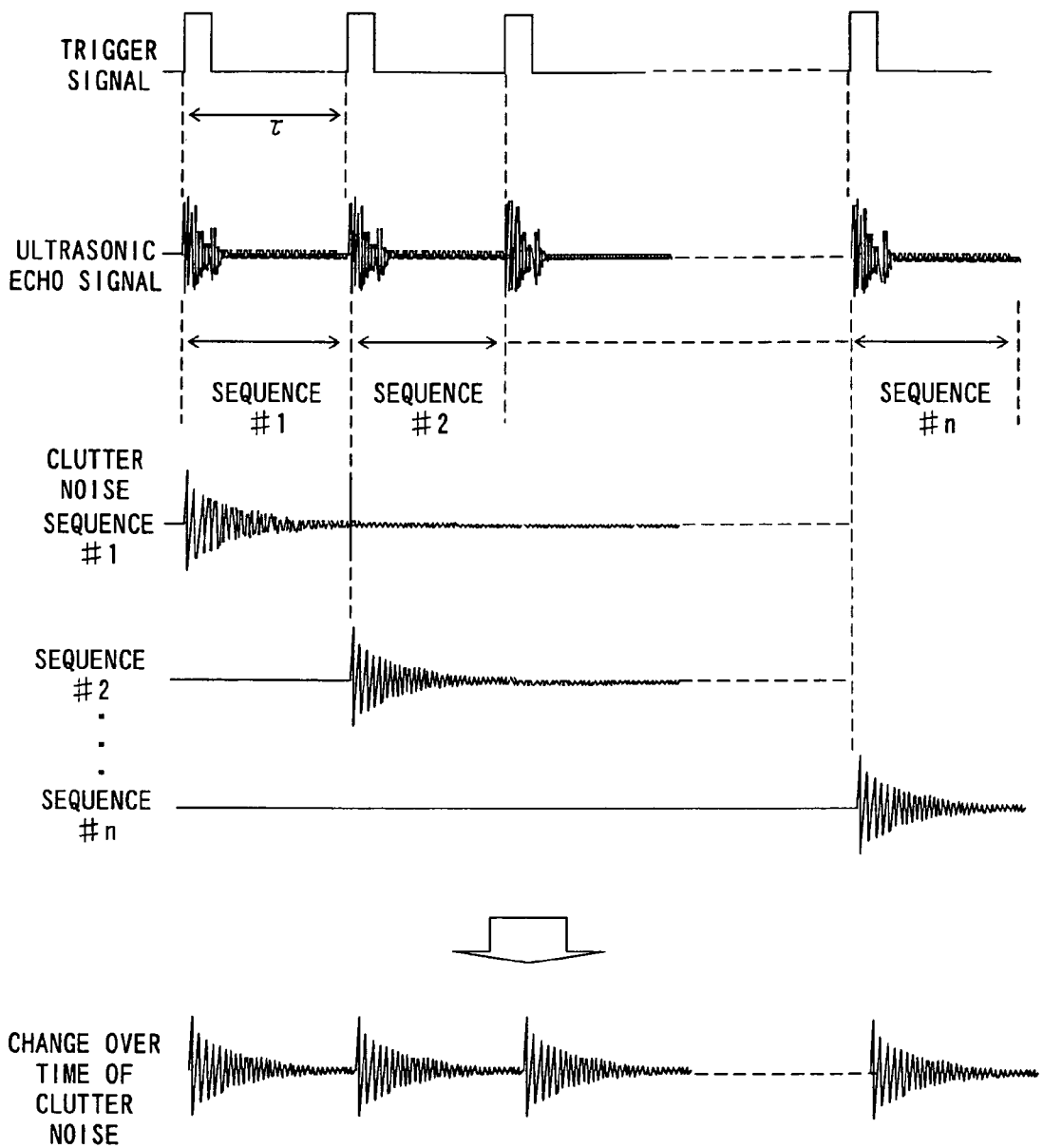
FIG. 11 is an explanatory diagram describing change over time of the trigger signal (upper), ultrasonic echo signal (middle), and clutter noise (lower).

FIG. 11 shows an explanatory diagram describing change over time of the trigger signal, ultrasonic echo signal, and clutter noise.

As shown in FIG. 11, the clutter noise of each sequence is generally the same even in any sequence, which is noise causing damped oscillation concurrently with passage of time. This clutter noise is noise wherein the noise for the amount of the number of sequences is shifted by time difference τ and superimposed, so includes various types of frequency components, and also includes n peaks at each start point-in-time of 1st through n'th sequence such as shown in FIG. 11.

Accordingly, with the conventional filtering processing using an LPF and an HPF, or the conventional filtering processing using a BPF, clutter noise including various types of frequency components could not have been subjected to filtering processing effectively, the portions where clutter noise occurs have been regarded as the reflected waves of ultrasonic pulses from the tracer particle group, and signal analysis has been made wherein clutter noise is erroneously treated as a valid signal.

Therefore, filtering processing (WF processing) using a WF is performed to prevent clutter noise from being regarded as a valid signal, and to sufficiently reduce clutter noise as to a valid signal. With the WF processing, first, a corresponding point-in-time echo signal is acquired from the digital ultrasonic echo signal.

FIG. 12 shows an explanatory diagram describing the relation between the sequence number (n) and the signal level of the digital ultrasonic echo signal, i.e., the corresponding point-in-time echo signal.

Figures 12A, 12B:
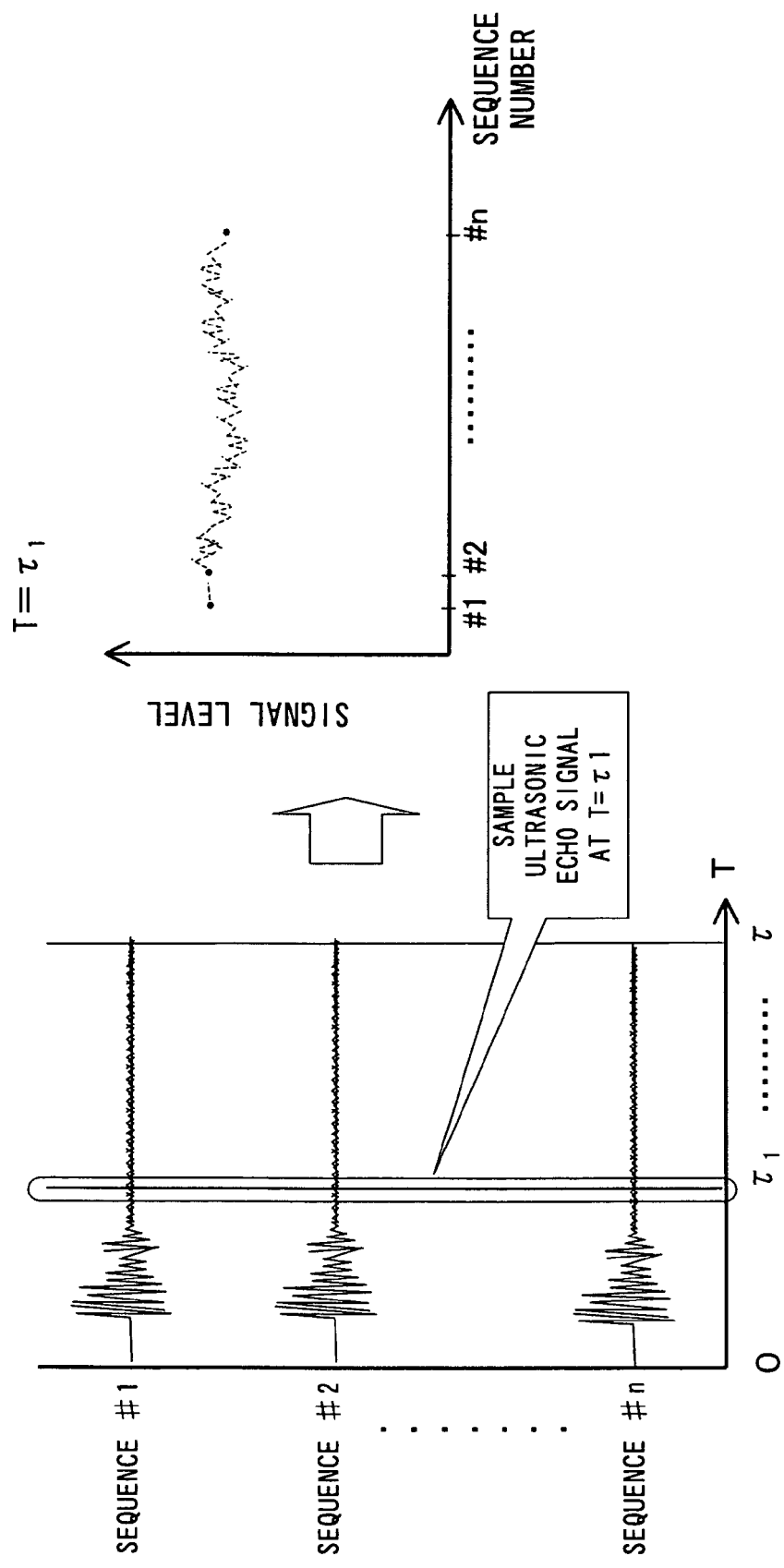
FIGS. 12A and 12B are explanatory diagrams describing the relation between the sequence number (n) and the signal level of the digital ultrasonic echo signal, more specifically.

FIG. 12A illustrates that the digital ultrasonic echo signals corresponding to from 1st sequence (hereinafter, referred to as sequence #1. The same to the other sequence order.) to n'th sequence are arrayed. In FIG. 12A, the horizontal axis T is the time axis, which shows elapsed point-in-time since the start point-in-time (T=0) of each sequence shown in FIG. 11, and the vertical axis shows a signal level. Note that T=τ corresponds to the oscillation cycle τ of the emission trigger shown in FIG. 11.

On the other hand, FIG. 12B illustrates the corresponding point-in-time echo level signal, which is the digital ultrasonic echo signal level of each sequence (sequence #1 through sequence #n) at the corresponding point-in-time $T=\tau_1$. The corresponding point-in-time echo level signal illustrated in FIG. 12B is obtained by sampling the digital ultrasonic echo signals of sequence #1 through sequence #n at $T=\tau_1$ illustrated in FIG. 12A.

The corresponding point-in-time echo level signal illustrated in FIG. 12B comprises the amount of an arbitrary number, for example, the amount of a number j (j is an arbitrary positive integer) wherein the corresponding point-in-time 10000 points or the like are set. The corresponding point-in-time echo level signal thus obtained is subjected to the FFT processing, and the frequency equivalent component to be obtained is subjected to filtering processing employing an S/N ratio as a threshold.

Figure 13:
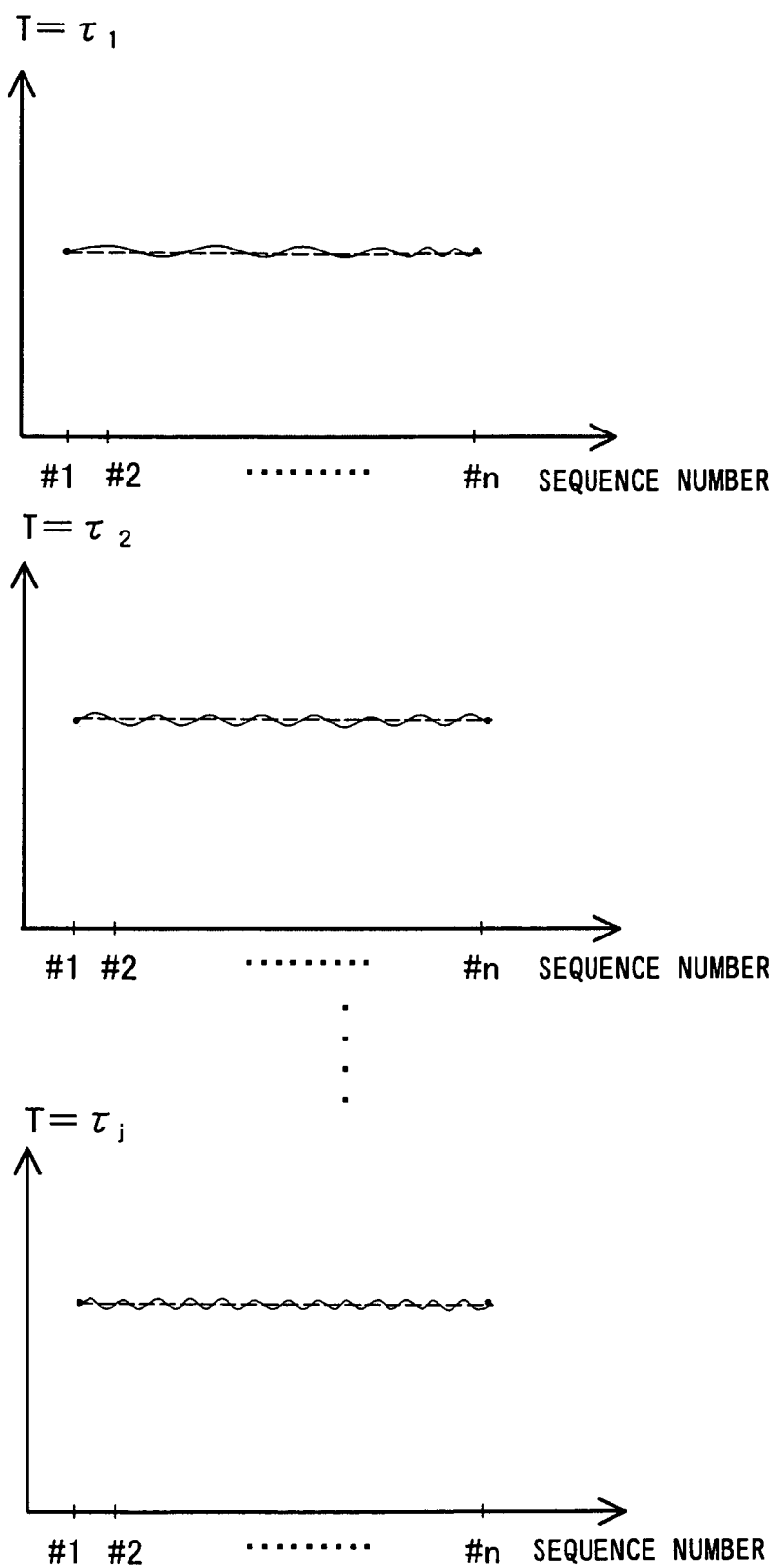
FIG. 13 is an explanatory diagram representing the schematic waveform of the frequency equivalent component obtained by subjecting the corresponding point-in-time echo level signal to the FFT processing.

FIG. 13 is an explanatory diagram representing the schematic waveform of the frequency equivalent component obtained by subjecting the corresponding point-in-time echo level signal to the FFT processing.

As shown in FIG. 13, the waveform of the frequency equivalent component obtained by subjecting the corresponding point-in-time echo level signal to the FFT processing is a waveform wherein a low-frequency equivalent component is superimposed on a direct-current equivalent component having almost no change as to the sequence number of the horizontal axis. This low-frequency equivalent component is a clutter noise component. The low-frequency equivalent component to be superimposed on the direct-current equivalent component, i.e., the clutter noise component is reduced by the filtering processing employing an S/N ratio as a threshold.

With this filtering processing, in the event that the S/N ratio at each sequence is greater than the threshold, the frequency equivalent component is treated as a valid signal (reflected waves), and is utilized at the time of calculating cross-correlation. Otherwise, the frequency equivalent component is treated as clutter noise, thereby distinguishing between the reflected waves (valid signal) and clutter noise.

Following the low-frequency equivalent component being subjected to the filtering processing, of the waveform of the frequency equivalent component obtained by subjecting the corresponding point-in-time echo level signal to the FFT processing, the waveform of the frequency equivalent component is subjected to the inverse FFT processing to obtain a corresponding point-in-time echo level signal.

Figure 14:
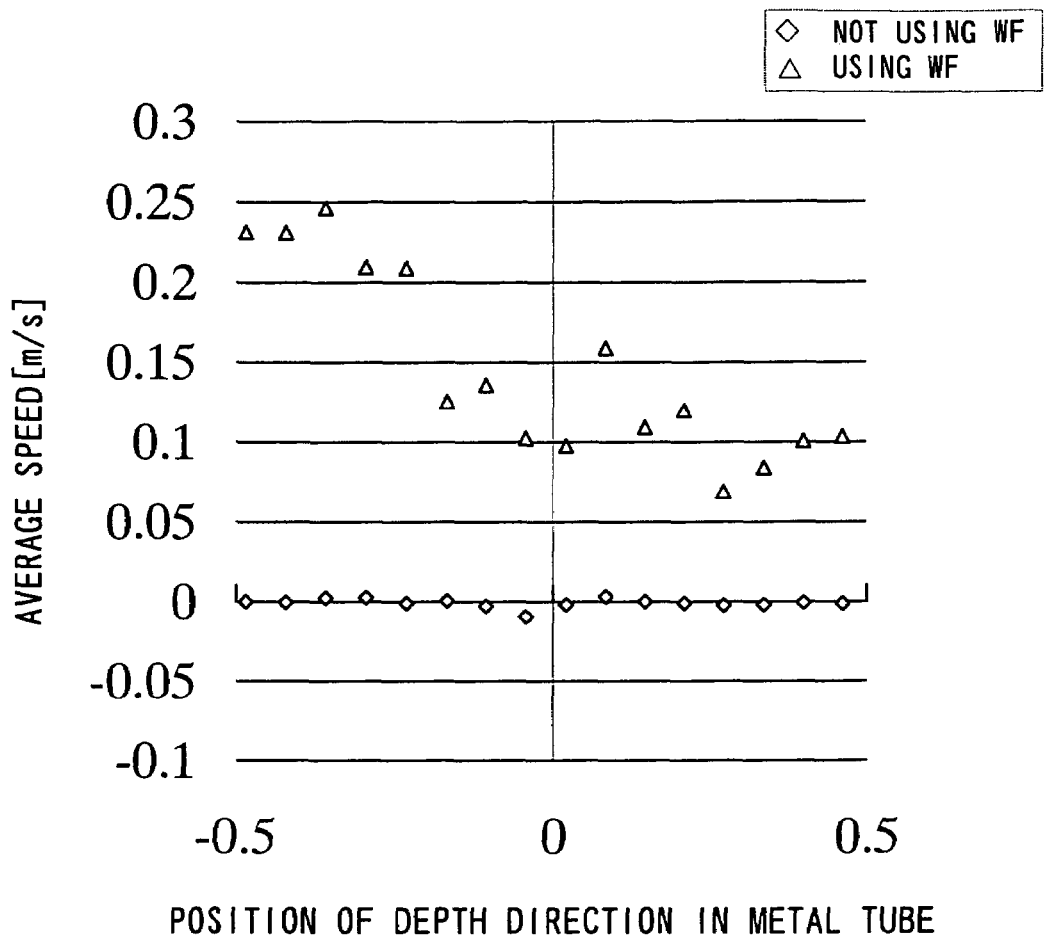
FIG. 14 is an explanatory diagram comparing the flow-speed distribution obtained in the case of employing the conventional cross-correlation method with the flow-speed distribution obtained in the case of employing the clutter noise reduction technique using a WF.

FIG. 14 is an explanatory diagram comparing the flow-speed distribution obtained in the case of employing the conventional cross-correlation method with the flow-speed distribution obtained in the case of employing the clutter noise reduction technique using a WF. Note that in FIG. 14, the horizontal axis denotes a position within the metal tube 18 in the depth direction of the metal tube 18 (y axial direction shown in FIG. 3), and the vertical axis denotes the average speed of the fluid.

According to FIG. 14, with the flow-speed distribution obtained in the case of employing the conventional cross-correlation method (distribution shown with ◇ in the drawing), the flow-speed is generally 0 in various places within the metal tube 18, which is a measurement result conflicted with reality. On the other hand, with the flow-speed distribution obtained in the case of employing the clutter noise reduction technique with a WF (distribution shown with Δ in the drawing), the flow-speed corresponding to change in the position within the metal tube 18 is obtained. That is to say, in the event of performing the flow-speed distribution and flow measurement of the fluid 17 flowing within the metal tube 18 using the ultrasonic flow-speed distributor and flowmeter 10, the clutter noise reduction technique using a WF seems to function effectively.

[Employment of the Flexible Search Window Method]

With the conventional cross-correlation method, when computing the reference waves and search waves of cross-correlation, the fixed search window method is employed wherein cross-correlation is computed keeping the search window in a constant size regardless of τ. An appropriate size has been set to the size of the search window depending on sense based on experience.

However, the speed and speed fluctuation within the metal tube 18 differs depending on the position thereof, so we cannot say that setting a constant search window to each τ to perform cross-correlation calculation is always reasonable. Further, there has been the demand for establishing a technique that does not rely on sense based on experience at the time of setting the size of the search window. To this end, with the ultrasonic flow-speed distributor and flowmeter according to the present invention, a flexible search window method for setting the size of the search window for each τ is employed.

The flexible search window method is a technique for setting the size of the search window for each τ, which is employed at the time of computing the cross-correlation of the reference waves and search waves in the reflector position-and-speed calculating process of the signal analyzing procedure. With computation of the cross-correlation of the reference waves and search waves in the flexible search window method, first, an average frequency $f_G$ and an RMS value σ are calculated, which are obtained by subjecting the corresponding point-in-time echo level signal, which acquires the level of the digital ultrasonic echo signal at each τ such as shown in FIG. 12, to Fourier transform such as the FFT.

Next, in accordance with a so-called 3σ rule of the statistics (with a normal distribution, 99.7% of the total is encompassed in a range of a mean value ±3σ), a frequency band that can emerge is regarded as a range of the average frequency $f_G$±3σ, and the minimum value $U_{min}$ and the maximum value $U_{max}$ of the speed of the ultrasonic reflectors 19 that can exist are obtained from $f_G$±3σ and $f_G$−3σ.

$$u_{\min} = \frac{c(f_G - 3\sigma)}{2f_0}, u_{\max} = \frac{c(f_G + 3\sigma)}{2f_0} \quad \text{[Expression 5]}$$

Next, the size of the search window, $\Delta\tau_{min}$ and $\Delta\tau_{max}$, is determined in accordance with the above concept of Expression 2.

$$\Delta\tau_{\min} = \frac{2u_{\min}\Delta t}{c}, \Delta\tau_{\max} = \frac{2u_{\max}\Delta t}{c} \quad \text{[Expression 6]}$$

Herein, Δt denotes sampling time.

Figure 15:
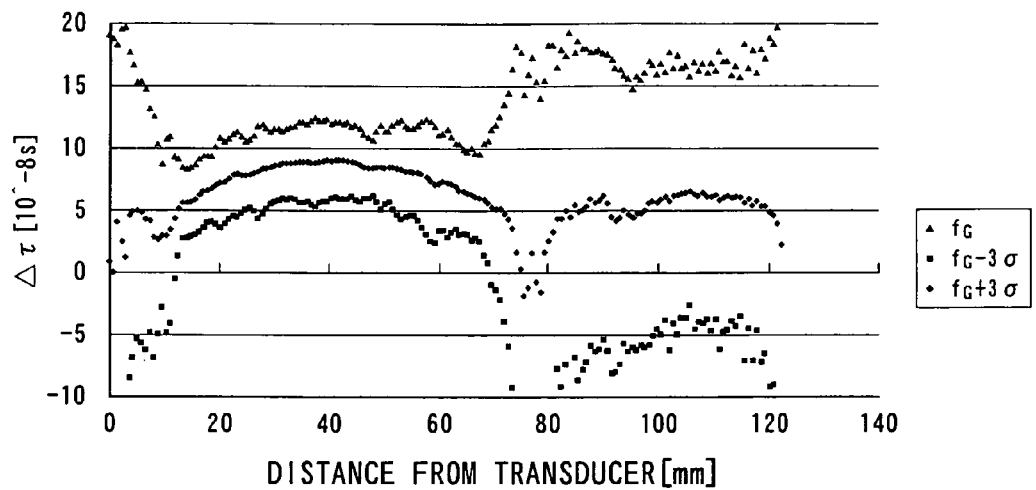
FIG. 15 is an explanatory diagrams describing the relation between the distance from the transducer obtained from a found value in the measurement system shown in FIG. 1 and FIG. 3 and the size $\Delta\tau$ of the search window.
Figure 16:
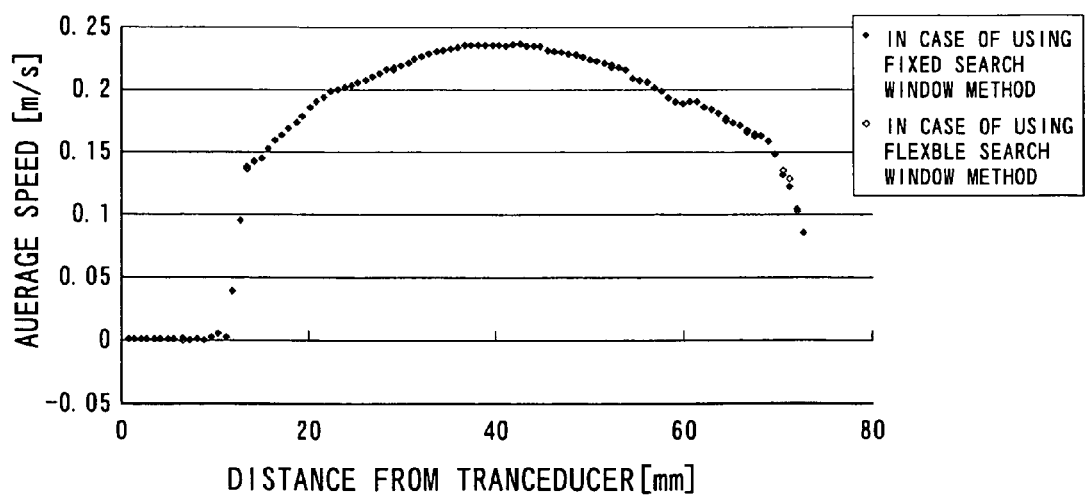
FIG. 16 is an explanatory diagram for comparing the average speed distribution measured in the case of obtaining the cross-correlation of the reference waves and search waves using the flexible search window method with using the fixed search window method.

FIG. 15 illustrates the relation between the distance from the transducer 15 obtained from a found value in the measurement system shown in FIG. 1 and FIG. 3 and the size Δτ of the search window, and FIG. 16 illustrates the average speed distribution measured in the case of obtaining the cross-correlation of the reference waves and search waves using the flexible search window method.

As shown in FIG. 15, with the zone of around 15 mm through 70 mm which is distance (vertical axis) from the transducer 15, the size Δτ of the search window in the case of the average frequency $f_G$ is densely distributed in a comparatively narrow range sandwiched with the size of the search window in $f_G$±3σ and $f_G$−3σ, so that the size of the search window seems to be set precisely. Further, according to FIG. 16, the average speed distribution obtained with the flexible search window method (distribution shown with ◇ in FIG. 16) is almost the same as the average speed distribution obtained with the fixed search window method (distribution shown with ♦ in FIG. 16), so that we can determine that the flexible search window method is effective.

Note that in FIG. 15, with the zone of 0 through around 15 mm and the zone of around 70 mm or more in the horizontal axis, the width of the size of the search window is great at $f_G$±3σ and $f_G$−3σ, but these portions are distances corresponding to the radial thickness of the metal tube 18 and the coupler or the outside of the metal tube 18, which are zones unnecessary for measurement of the flow-speed distribution and flow of the fluid. Further, in the FIG. 16, with the zone of 0 through around 15 mm and the zone of around 70 mm or more in the horizontal axis wherein the width of the size of the search window becomes great in FIG. 15, i.e., with the zones unnecessary for measurement of the flow-speed distribution and flow of the fluid, the average speed is 0 [m/s].

[Installation of the Emission Trigger]

With the ultrasonic flow-speed distributor and flowmeter 10, an emission trigger serving as an external trigger performs control of the ultrasonic pulse oscillating means 23 employed for oscillation of ultrasonic pulses above a sine wave, and control of the AD converter 32 for converting an analog signal into a digital signal. Timing control of the ultrasonic pulse oscillating means 23 and the AD converter 32 is precisely performed by installing the emission trigger.

On the other hand, in the event that the sampling frequency of the AD converter 32 is set in several hundred MHz order, it is extremely difficult to actuate the AD converter 32 strictly in accordance with the trigger, so a frequency shift occurs. To this end, focusing on an emission region occurring in reflected waves immediately following oscillation of ultrasonic pulses from the transducer 15, cross-correlation is computed assuming that the emission region of the previously received reflected waves is taken as search waves, and the emission region of the latterly received reflected waves is taken as reference waves, thereby obtaining time amount-of-change Δτ.

Further, interpolation is performed using distribution approximation, correction is made by this amount of Δτ before computation of cross-correlation. However, following correction being performed at the sampling time interval of the reflected waves, correction is finally applied to Δτ at each point on the measurement line with mesh, which is finely divided into a more scattered interval, thereby correcting a delicate time deviation due to the trigger from the emission trigger oscillating means 22.

Oscillation control of the emission trigger oscillated from the emission trigger oscillating means 22 can be programmed and set beforehand, or various settings such as the frequency of the trigger signal can be accepted before start of measurement, which can be done without any restriction.

Figure 17:
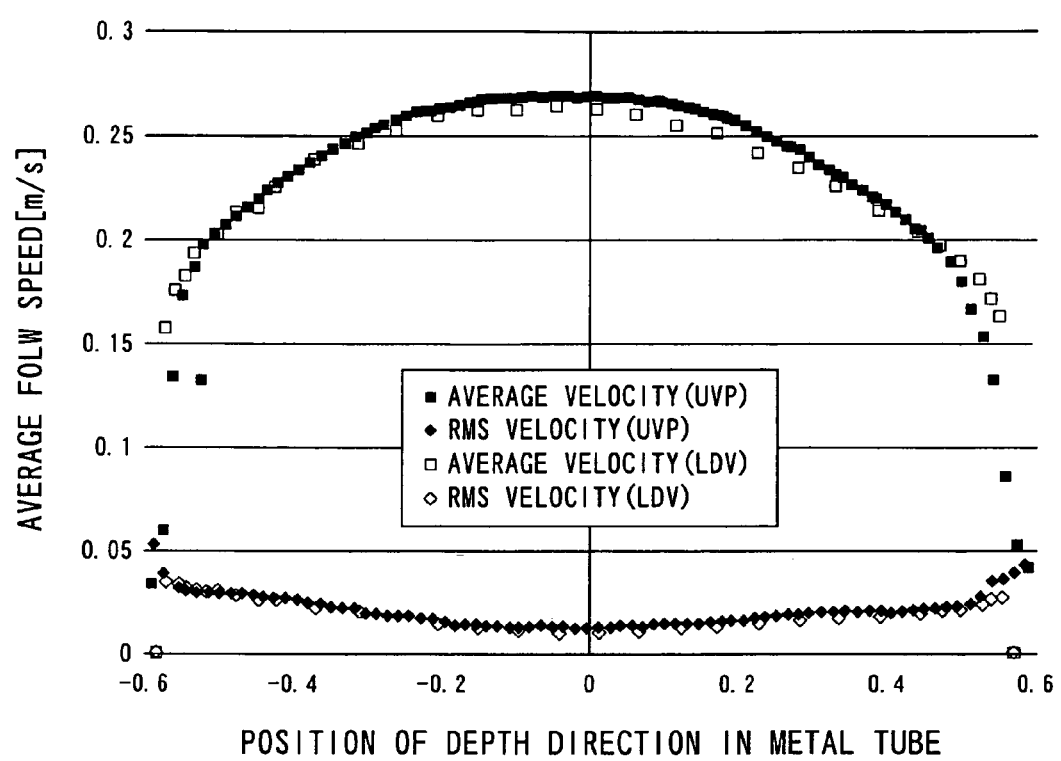
FIG. 17 is an explanatory diagram comparing the average flow-speed distribution of the fluid between the ultrasonic flow-speed distributor and flowmeter and a laser Doppler flow-speed meter (LDV).

FIG. 17 is an explanatory diagram comparing the average flow-speed distribution of the fluid between the ultrasonic flow-speed distributor and flowmeter 10 and a laser Doppler flow-speed meter (LDV).

In FIG. 17, one (distribution shown by ■ in the drawing) is a flow-speed distribution obtained by using the ultrasonic flow-speed distributor and flowmeter 10, which is an average flow-speed distribution calculated by tilting the transducer 15 as to the metal tube 18, and obtaining the time average for the amount of 3000 point-in-time. The other (distribution shown with ■ in the drawing) is an average flow-speed distribution obtained by measurement of the LDV. According to FIG. 17, the flow-speed distribution obtained by using the ultrasonic flow-speed distributor and flowmeter 10 matches the average flow-speed distribution as to the measurement of the LDV very well, so we found that the ultrasonic flow-speed distributor and flowmeter 10 can perform the flow-speed distribution and flow measurement of the fluid precisely.

As described above, the ultrasonic flow-speed distributor and flowmeter 10 can measure the flow-speed distribution and flow of the fluid 17 precisely by reducing a noise level, and preventing error of measurement due to noise components, even in the event that an ultrasonic echo signal is weak as to noise, which is constantly present (regardless of time), such as clutter noise, for example.

With the description of the embodiment, description has been made in the case wherein a fluid tube for guiding the fluid to be measured 17 is the metal tube 18 as shown in FIG. 1 and the like, as an example, but in the event that an ultrasonic echo signal is weak as to noise, which is constantly present, the other specific examples are:

1) Case of performing the flow-speed distribution and flow measurement of a fluid flowing within a fluid tube (non-metal tube other than the metal tube 18, e.g., including an acrylic tube or polyvinyl chloride tube) under an environment wherein the power source noise or inverter noise of a pump are mixed,
2) Case of performing flow-speed distribution and flow measurement by directly bring the surface of the transducer 15 into contact with the fluid 17 flowing through the metal tube 18,
3) Case of the acoustic impedance of the ultrasonic reflector 19 being close to the acoustic impedance of the fluid to be measured 17 in the above cases 1) and 2),
4) Case of the volume of the ultrasonic reflector 19 being small in the above cases 1) and 2), and
5) Case of the density of the ultrasonic reflector 19 being small in the above cases 1) and 2).

INDUSTRIAL APPLICABILITY

According to the ultrasonic flow-speed distributor and flowmeter, ultrasonic flow-speed distribution and flow measurement method, and ultrasonic flow-speed distribution and flow measurement program according to the present invention, for example, such as a case wherein a fluid tube for guiding the fluid to be measured is a metal tube, even in the event that clutter noise is superimposed on an ultrasonic echo signal, and the ultrasonic echo signal is weak, the WF processing unit can sufficiently reduce noise components as to standing noise such as clutter noise, and as to the ultrasonic echo signal. Accordingly, even in a measurement scene such that standing noise is superimposed on the ultrasonic echo signal, the flow-speed distribution and flow of the fluid can be measured precisely, which is industrially beneficial.

The invention claimed is:

1. An ultrasonic flow-speed distributor and flowmeter comprising:
    emission trigger oscillating means for outputting a trigger signal;
    ultrasonic oscillating means for generating and outputting ultrasonic pulses by the trigger signal from the emission trigger oscillating means;
    ultrasonic pulse receiving means for transmitting the ultrasonic pulses output from the ultrasonic oscillating means toward a measurement line within a fluid, and receiving an ultrasonic echo signal serving as reflected waves reflected off an ultrasonic reflector suspended within the fluid;
    signal processing means for subjecting the ultrasonic echo signal received by the ultrasonic pulse receiving means to signal processing; and
    signal analyzing means for analyzing the ultrasonic echo signal subjected to the signal processing by the signal processing means, calculating the position and speed of the ultrasonic reflector positioned along the measurement line, and measuring at least one of the flow-speed distribution and flow of the fluid from the calculated results,
    wherein the signal processing means include a band-pass filtering processing unit for performing filtering processing for extracting the same frequency band as the ultrasonic pulses, of the received ultrasonic echo signals, an AD converter for subjecting the ultrasonic echo signal received from the band-pass filtering processing unit to analog-to-digital conversion, and a wall filter processing unit for subjecting the received ultrasonic echo signal to filtering processing using a wall filter, and said wall filter processing unit is configured so as to perform filtering processing wherein low-frequency equivalent components are discarded from the corresponding point-in-time echo level signals regarding all of the corresponding points-in-time which are obtained regarding a plurality of corresponding points-in-time from the ultrasonic echo signals for the amount of n+1 sequences, wherein n is a positive integer.

2. An ultrasonic flow-speed distributor and flowmeter according to claim 1, wherein the wall filter processing unit is configured so as to perform filtering processing wherein low-frequency equivalent components are discarded from the corresponding point-in-time echo level signals assuming that the S/N ratio of a signal obtained by subjecting the corresponding point-in-time echo level signals to Fourier transform is taken as a threshold.

3. An ultrasonic flow-speed distribution and flow measurement method comprising:
   an emission trigger oscillating procedure for outputting a trigger signal;
   an ultrasonic oscillating procedure for generating and outputting ultrasonic pulses by the trigger signal output from the emission trigger oscillating procedure;
   an ultrasonic pulse receiving procedure for transmitting the ultrasonic pulses output from the ultrasonic oscillating procedure toward a measurement line within a fluid, and receiving an ultrasonic echo signal serving as reflected waves reflected off an ultrasonic reflector suspended within the fluid;
   a signal processing procedure for subjecting the ultrasonic echo signal received by the ultrasonic pulse receiving means to signal processing; and
   a signal analyzing procedure for analyzing the ultrasonic echo signal subjected to the signal processing by the signal processing procedure, calculating the position and speed of the ultrasonic reflector positioned along the measurement line, and measuring at least one of the flow-speed distribution and flow of the fluid from the calculated results,
   wherein the signal processing procedure includes a band-pass filtering processing process for performing filtering processing for extracting the same frequency band as the ultrasonic pulses, of the received ultrasonic echo signals, an AD conversion process for subjecting the ultrasonic echo signal received from the band-pass filtering processing process to analog-to-digital conversion, and a wall filter processing process for subjecting the received ultrasonic echo signal to filtering processing using a wall filter, and said wall filter processing process performs filtering processing wherein low-frequency equivalent components are discarded from the corresponding point-in-time echo level signals regarding all of the corresponding points-in-time which are obtained regarding a plurality of corresponding points-in-time from the ultrasonic echo signals for the amount of n+1 sequences, wherein n is a positive integer.

4. An ultrasonic flow-speed distribution and flow measurement method according to claim 3, the ultrasonic oscillating procedure comprising:
   an electric pulse signal generating process for receiving the trigger signal to generate an electric pulse signal; and an ultrasonic pulse generating process for converting the electric pulse signal generated in said electric pulse signal generating process into ultrasonic pulses, and transmitting the ultrasonic pulses.

5. An ultrasonic flow-speed distribution and flow measurement method according to claim 3, the signal analyzing procedure comprising:
   a reflector position-and-speed calculating process for calculating the position and speed of an ultrasonic reflector group within a fluid;
   a flow-speed distribution calculating process for calculating the flow-speed distribution of said fluid from the position and speed of the ultrasonic reflector group within the fluid calculated in said reflector position-and-speed calculating process; and
   a flow calculating process for integrating the flow-speed distribution calculated in said flow-speed calculating process along the internal area of a fluid tube to calculate flow.

6. An ultrasonic flow-speed distribution and flow measurement method according to claim 3, the wall filter processing process comprising:
   a corresponding point-in-time echo level acquisition step for acquiring, from digitized ultrasound echo signals, a corresponding point-in-time echo level signal representing the relation between the number of sequences and a signal level at the corresponding point-in-time of each sequence;
   an FFT processing step for subjecting the corresponding point-in-time echo level signal obtained in said corresponding point-in-time echo level signal acquisition step to Fourier transform;
   a clutter noise reduction processing step for subjecting the frequency equivalent components of the corresponding point-in-time echo level signal obtained in said FFT processing step to filtering processing; and
   an inverse FFT processing step for sorting in time-sequence order the frequency equivalent components of said corresponding point-in-time echo level signal as inverse Fourier transform again to restructure a digital ultrasonic echo signal.

7. An ultrasonic flow-speed distribution and flow measurement method according to claim 6, wherein the clutter noise reduction processing step subjects the frequency equivalent components of the corresponding point-in-time echo level signal obtained in the FFT processing wherein an S/N ratio is taken as a threshold.

8. An ultrasonic flow-speed distribution and flow measurement method according to claim 3, the reflector position-and-speed calculating process comprising:
   a cross-correlation computing processing step for computing the cross-correlation of reference waves and search waves;
   a phase identifying step for regarding reflected waves as the reflected waves from the same ultrasonic reflector, in the event that the correlation value of said reference waves and search waves is equal to or greater than a steady threshold value;
   a phase difference computing step for computing the phase difference of the reference waves and the search waves identified in said phase identifying step; and
   a position-and-speed calculating step for calculating the position and speed of the ultrasonic reflector from the phase difference obtained in said phase difference computing step,
   wherein the cross-correlation computing processing step subjects the corresponding point-in-time echo level signal for each corresponding point-in-time to Fourier transform, calculates an average frequency $f_G$ and a root-mean-square deviation value $\sigma$, calculates the speed range of the ultrasonic reflector corresponding to a range of $f_G \pm 3\sigma$ using the calculated average frequency $f_G$ and root-mean-square deviation value $\sigma$, and sets the size of the search window using the calculated speed range of the ultrasonic reflector.

9. A computer readable medium including computer executable instructions, wherein the instructions, when executed by a processor, cause the processor to perform a method comprising:
   outputting a trigger signal;
   generating and outputting ultrasonic pulses by the trigger signal output from said outputting;
   transmitting the ultrasonic pulses output from said generating and outputting ultrasonic pulses toward a measurement line within a fluid, and receiving an ultrasonic echo signal serving as reflected waves reflected off an ultrasonic reflector suspended within said fluid;
   subjecting the ultrasonic echo signal received by said ultrasonic pulse receiving means to signal processing; and analyzing the ultrasonic echo signal subjected to the signal processing by said subjecting, calculating the position and speed of said ultrasonic reflector positioned along said measurement line, and measuring at least one of the flow-speed distribution and flow of said fluid from the calculated results;

wherein said subjecting includes a band-pass filtering processing process for performing filtering processing for extracting the same frequency band as the ultrasonic pulses, of the received ultrasonic echo signals, an AD conversion process for subjecting the ultrasonic echo signal received from said band-pass filtering processing process to analog-to-digital conversion, and a wall filter processing process for subjecting the received ultrasonic echo signal to filtering processing using a wall filter, and said wall filter processing process performs filtering processing wherein low-frequency equivalent components are discarded from the corresponding point-in-time echo level signals regarding all of the corresponding points-in-time which are obtained regarding a plurality of corresponding points-in-time from the ultrasonic echo signals for the amount of n+1 sequences, wherein n is a positive integer.

10. The computer readable medium according to claim 9, wherein said wall filter processing process comprises:

acquiring a corresponding point-in-time echo level signal representing the relation between the number of sequences and a signal level at the correspond point-in-time of each sequence;

subjecting the corresponding point-in-time echo level signal obtained in said acquiring to Fourier transform;

subjecting the frequency equivalent components of the corresponding point-in-time echo level signal obtained in said subjecting the corresponding point-in-time echo level signal to filtering processing; and sorting the frequency equivalent components of said corresponding point-in-time echo level signal as inverse Fourier transform again to restructure a digital ultrasonic echo signal, wherein said instructions cause the processor to execute said acquiring, subjecting the corresponding point-in-time echo level signal, subjecting the frequency equivalent components, and sorting in said wall filter processing process.

11. The computer readable medium according to claim 9, wherein said subjecting comprising:

calculating the position and speed of an ultrasonic reflector group within a fluid;

calculating the flow-speed distribution of said fluid from the position and speed of the ultrasonic reflector group within the fluid calculated in said reflector position-and-speed calculating process; and integrating the flow-speed distribution calculated in said flow-speed calculating process along the internal area of a fluid tube to calculate flow;

wherein said instructions cause the processor to execute said calculating the position and speed, and outputting the flow-speed distribution, and integrating the flow-speed distribution in said subjecting.

12. The computer readable medium according to claim 9, wherein said instructions cause the processor to execute filtering processing wherein an S/N ratio is taken as a threshold as to the frequency equivalent components of the corresponding point-in-time echo level signal.

* * * * *